US008761437B2

(12) United States Patent
Kirovski et al.

(10) Patent No.: US 8,761,437 B2
(45) Date of Patent: Jun. 24, 2014

(54) MOTION RECOGNITION

(75) Inventors: Darko Kirovski, Kirkland, WA (US); Michail Raptis, Attiki (GR)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 13/030,154

(22) Filed: Feb. 18, 2011

(65) Prior Publication Data

US 2012/0214594 A1    Aug. 23, 2012

(51) Int. Cl.
*G06K 9/00* (2006.01)

(52) U.S. Cl.
USPC ......................................................... 382/103

(58) Field of Classification Search
None
See application file for complete search history.

(56) References Cited

U.S. PATENT DOCUMENTS

| | | | |
|---|---|---|---|
| 6,249,606 B1 * | 6/2001 | Kiraly et al. | 382/195 |
| 6,571,193 B1 | 5/2003 | Unuma et al. | |
| 6,606,412 B1 | 8/2003 | Echigo et al. | |
| 7,356,172 B2 | 4/2008 | Fan et al. | |
| 2005/0180637 A1 | 8/2005 | Ikeda et al. | |
| 2006/0013475 A1 | 1/2006 | Philomin et al. | |
| 2007/0285419 A1 * | 12/2007 | Givon | 345/420 |
| 2008/0125678 A1 | 5/2008 | Breen | |
| 2009/0085864 A1 | 4/2009 | Kutliroff et al. | |
| 2010/0197390 A1 * | 8/2010 | Craig et al. | 463/30 |
| 2012/0163723 A1 * | 6/2012 | Balan et al. | 382/224 |

OTHER PUBLICATIONS

Forbes et al. [An Efficient Search Algorithm for Motion Data Using Weighted PCA] Forbes, Kate, and Eugene Fiume. "An efficient search algorithm for motion data using weighted PCA." Proceedings of the 2005 ACM SIGGRAPH/Eurographics symposium on Computer animation. ACM, 2005.*
Zhang et al. [Three-Dimensional Unilateral Method for the Bilateral Measurement of Condylar Movements of Condylar Movements] Zhang, Xin, James A. Ashton-Miller, and Christian S. Stohler. "Three-dimensional unilateral method for the bilateral measurement of condylar movements." Journal of biomechanics 28.8 (1995): 1007-1011.*
Kim et al. [Motion Control of a Dancing Character with Music] Kim, Gunwoo, Yan Wang, and Hyewon Seo. "Motion control of a dancing character with music." Computer and Information Science, 2007. ICIS 2007. 6th IEEE/ACIS International Conference on. IEEE, 2007.*

(Continued)

*Primary Examiner* — Stephen R Koziol
*Assistant Examiner* — Amandeep Saini
(74) *Attorney, Agent, or Firm* — Stephen Wight; Peter Taylor; Micky Minhas

(57) ABSTRACT

Human body motion is represented by a skeletal model derived from image data of a user. Skeletal model data may be used to perform motion recognition and/or similarity analysis of body motion. An example method of motion recognition includes receiving skeletal motion data representative of a user data motion feature from a capture device relating to a position of a user within a scene. A cross-correlation of the received skeletal motion data relative to a plurality of prototype motion features from a prototype motion feature database is determined. Likelihoods that the skeletal motion data corresponds to each of the plurality of prototype motion features are ranked. The likelihoods are determined using the cross-correlation. A classifying operation is performed on a subset of the plurality of prototype motion features. The subset of the plurality of prototype motion features is chosen because its members have the relatively highest likelihoods of corresponding to the skeletal motion data.

20 Claims, 16 Drawing Sheets

(56) References Cited

OTHER PUBLICATIONS

Mallot, Hanspeter A., and Kai Basten. "Embodied spatial cognition: Biological and artificial systems." Image and Vision Computing 27.11 (2009): 1658-1670.*

Inoue, Takuya, and Shigeo Abe. "Fuzzy support vector machines for pattern classification." Neural Networks, 2001. Proceedings. IJCNN'01. International Joint Conference on. vol. 2. IEEE, 2001.*

"International Search Report", Mailed Date: Oct. 10, 2012, Application No. PCT/US2012/024787, Filed Date: Feb. 12, 2012, pp. 10. English.

Spiro, et al., "Hands by hand: crowd-sourced motion tracking for gesture annotation", Retrieved at << http://cims.nyu.edu/~bregler/acvh110_hands.pdf >>, Jun. 13, 2010, pp. 8.

Wachs, et al., "Recognizing human postures and poses in monocular still images", Retrieved at << http://web.ics.purdue.edu/~jpwachs/papers/2009/IPCV_2009_camera_ready_corrected.pdf >>, 2009, pp. 1-7.

Khoury, et al., "Classifying 3D human motions by mixing fuzzy gaussian inference with genetic programming", Retrieved at << http://userweb.port.ac.uk/~khourym/mehdi_khoury_icira2009.pdf >>, Proceedings of the 2nd International Conference on Intelligent Robotics and Applications, 2009, pp. 1-12.

Murphy, et al., "Object detection and localization using local and global features", Retrieved at << http://people.csail.mit.edu/torralba/publications/localAndGlobal.pdf >>, Lecture Notes in Computer Science, vol. 4170, 2006, pp. 1-20.

Friedman, et al., "Additive logistic regression: a statistical view of boosting", Retrieved at << http://www-stat.stanford.edu/~hastie/Papers/AdditiveLogisticRegression/alr.pdf >>, The Annals of Statistics, vol. 28, No. 2, 2000, pp. 337-374.

* cited by examiner

900

1100

MOTION RECOGNITION

BACKGROUND

Computing applications such as computer games and multimedia applications have used controls to allow users to manipulate game characters or other aspects of an application. Typically, such controls are input using, for example, controllers, remotes, keyboards, mice, or the like. More recently, computer games and multimedia applications have begun employing cameras and software gesture recognition engines to provide a human computer interface ("HCI") or natural user interface ("NUI"). With HCI or NUI, user motions are detected, and some motions or poses represent gestures which are used to control game characters (e.g., a user's avatar) or other aspects of a multimedia application.

In a natural user interface, an image capture device captures images of the user's motions in its field of view. The field of view can be represented as a finite Euclidean three-dimensional (3-D) space. The data describing the user's motions may be used for a wide range of purposes. For example, games may be created to allow users to exercise by performing activities such as exercising or dancing. It may be desirable for a game device to be able to recognize a user's pattern of motion.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Technology is presented for recognition of human body motion represented by a skeletal model derived from image data of a user. An example method of motion recognition includes receiving skeletal motion data representative of a user data motion feature from a capture device, the skeletal motion data relating to a position of a user within a scene. A cross-correlation of the received skeletal motion data relative to a plurality of prototype motion features from a prototype motion feature database is determined. Likelihoods that the skeletal motion data corresponds to each of the plurality of prototype motion features are ranked. The likelihoods are based on the cross-correlation. A classifying operation is performed on a subset of the plurality of prototype motion features. The subset of the plurality of prototype motion features is chosen because the members of the subset have the relatively highest likelihoods of corresponding to the skeletal motion data. The "winner" of the classifying operation may be chosen as a match for the motion represented by the received skeletal motion data.

Technology is further presented relating to a system for performing motion recognition and/or similarity analysis of body motion. The motion recognition may be based on skeletal model data derived from image data of a user. In an embodiment, a system includes a processing unit and a system memory. The system memory includes one or more tangible, non-transitory, computer-readable storage media. The tangible, non-transitory, computer-readable storage media comprises code configured to direct the processing unit to receive skeletal motion data representative of a user data motion feature from a capture device. Additional code directs the processing unit to determine a cross-correlation of the received skeletal motion data relative to a plurality of prototype motion features from a prototype motion feature database. Still additional code directs the processing unit to rank the likelihoods that the skeletal motion data corresponds to each of the plurality of prototype motion features. In an example embodiment, the likelihoods are based on the cross-correlation. Other code directs the processing unit to perform a classifying operation on a subset of the plurality of prototype motion features. The subset of the plurality of prototype motion features is chosen because the members have the relatively highest likelihoods of corresponding to the skeletal motion data.

Technology is additionally presented relating to one or more tangible, non-transitory, computer-readable storage media. The tangible, non-transitory, computer-readable storage media stores code that may direct a processor to receive skeletal motion data representative of a user data motion feature from a capture device. Additional code stored on the tangible, non-transitory, computer-readable storage media directs the processor to determine a cross-correlation of the received skeletal motion data relative to a plurality of prototype motion features from a prototype motion feature database. Other code on the tangible, non-transitory storage media directs the processor to rank likelihoods that the skeletal motion data corresponds to each of the plurality of prototype motion features. The likelihoods may be based on the cross-correlation. Additional code stored on the tangible, non-transitory, computer-readable storage media directs the processor to perform a classifying operation on a subset of the plurality of prototype motion features. The subset of the plurality of prototype motion features is chosen because members of the subset have the relatively highest likelihoods of corresponding to the skeletal motion data.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 7, which includes

DETAILED DESCRIPTION

Figure 1A:
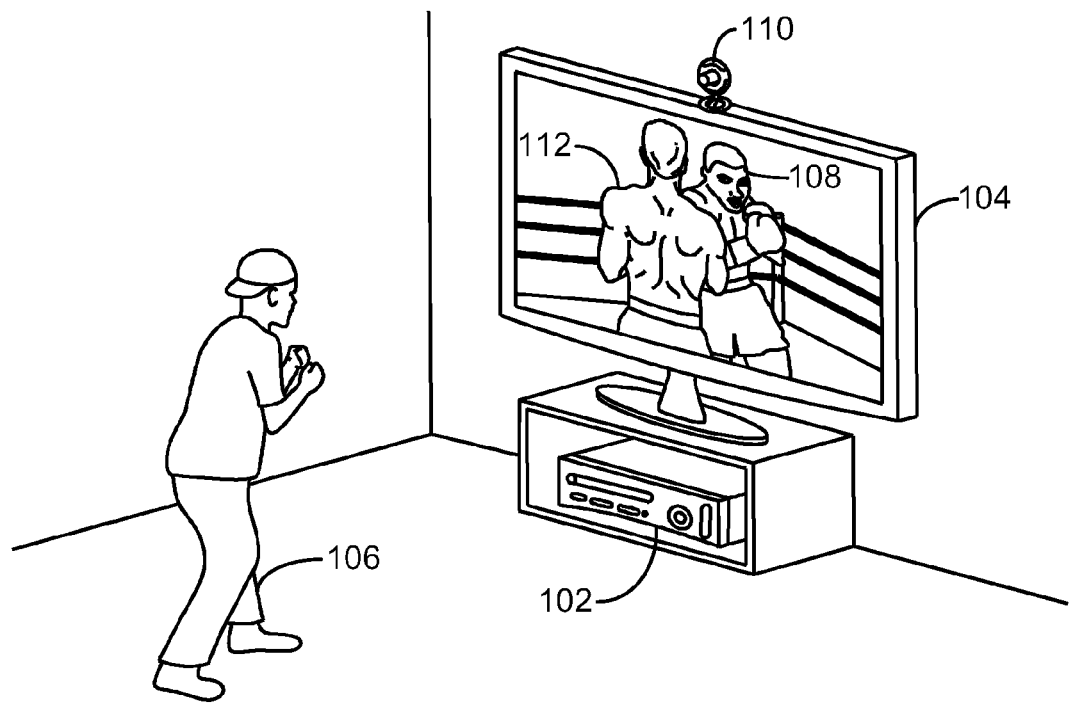
FIG. 1A is a diagram showing an example embodiment of a target recognition, analysis, and tracking system with which a user is interacting, and in which technology embodiments for motion recognition can operate.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "multimedia console," "game console," or the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The present technology relates to a real-time gesture classification system for skeletal wireframe motion. An example embodiment includes an angular representation of the skeleton that provides recognition robustness under noisy input, a cascaded correlation-based classifier for multivariate time-series data, and a distance metric based on dynamic time-warping to evaluate the difference in motion between an acquired gesture (i.e., a user input motion feature) and an oracle (i.e., a prototype motion feature) for the matching gesture. The classifier is cascaded because it performs two phases of operation. In the first phase, prototype motion feature data is scored based on a cross-correlation to compute a maximum likelihood that data represent motion of a user corresponds to each specific prototype motion feature. In the second phase, the prototype motion features having the highest likelihood of matching the user input are subjected to a classifying operation to select a closest match. The classifying operation may include a number of techniques, such as pairwise classification using logistic regression, linear discriminant analysis or support vector machine (SVM) analysis, to name just a few examples. A classifier according to the present technology may operate under an assumption that input motion adheres to a known, canonical time-base, such as a musical beat.

Real-time depth sensing systems are useful in videogames because they may be used to allow the human body to control action of the game. One such system parses a depth-map stream at 30 frames per second to estimate in real-time the positions of 16 predefined points that constitute a wireframe skeleton of a moving user. Subsequent algorithmic processing can then attempt to understand the user's motion (e.g., recognize user gestures) in order to interactively control gameplay.

An example embodiment of the present technology may enhance the interaction that the dancer (user) has with avatar animation and control, by allowing him/her to dance at any time any of the pre-choreographed gestures that are modeled as prototype motion features in a database. To address this objective, an example system learns a statistical model that captures the nuances of a predetermined set of gesture classes, and then uses the model to classify the input skeletal motion of a user.

Referring initially to FIG. 1A, the hardware for implementing the present technology includes a target recognition, analysis, and tracking system 100 which may be used to recognize, analyze, and/or track a human target such as the user 106. Embodiments of the target recognition, analysis, and tracking system 100 include a computing environment 102 for executing a gaming or other application, and an audio-visual device 16 for providing audio and visual representations from the gaming or other application. The system 100 further includes a capture device 110 for capturing positions and movements performed by the user, which the computing environment receives, interprets and uses to control the gaming or other application. Each of these components is explained in greater detail below.

As shown in FIG. 1A, in an example embodiment, the application executing on the computing environment 102 may be a game with real time interaction such as a boxing game that the user 106 may be playing. For example, the computing environment 102 may use the audiovisual device 16 to provide a visual representation of a boxing opponent 108 to the user 106. The computing environment 102 may also use the audiovisual device 16 to provide a visual representation of a player avatar 112 that the user 106 may control with his or her movements. For example, the user 106 may throw a punch in physical space to cause the player avatar 112 to throw a punch in game space. Thus, according to an example embodiment, the computer environment 102 and the capture device 110 of the target recognition, analysis, and tracking system 100 may be used to recognize and analyze the punch of the user 106 in physical space such that the punch may be interpreted as a game control of the player avatar 112 in game space.

Figure 1B:
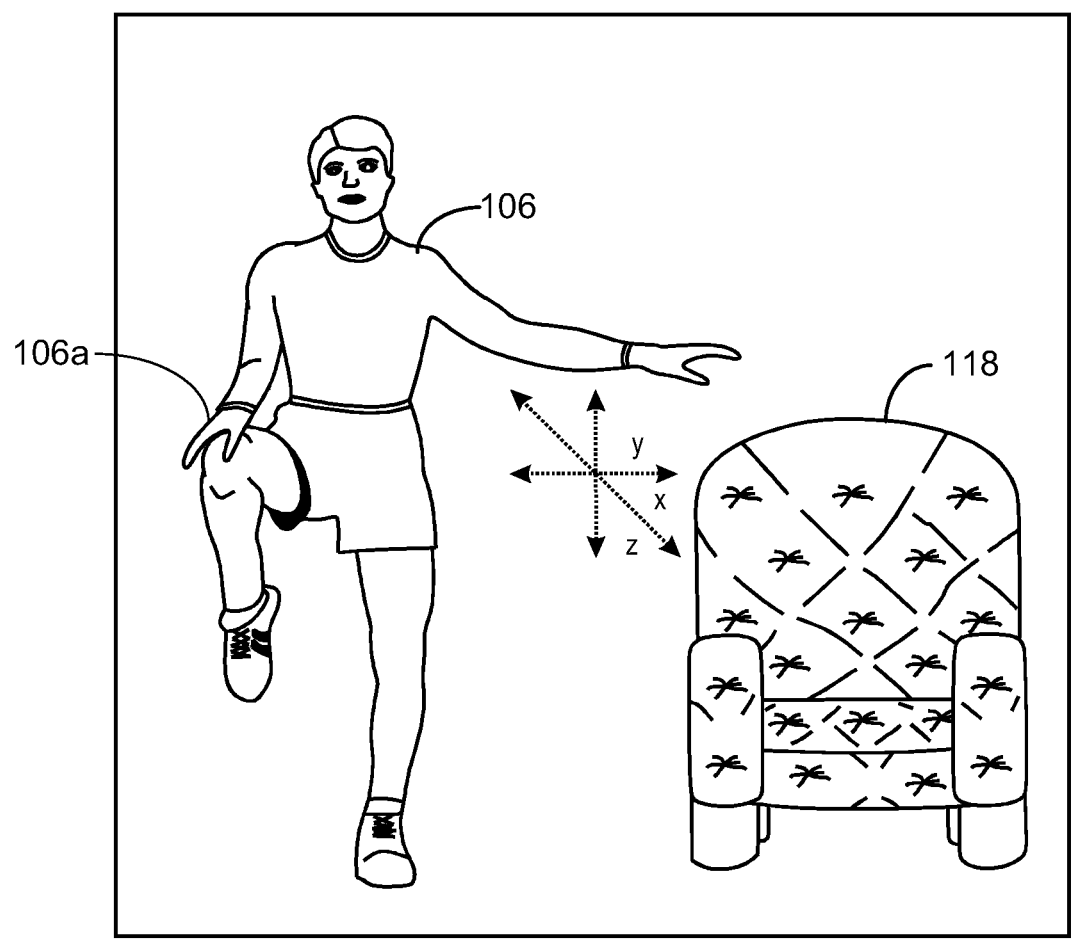
FIG. 1B is a diagram showing embodiments of a camera field of view and a 3-D orthogonal coordinate reference system defined within the field of view.

Other movements by the user 106 may also be interpreted as other controls or actions, such as controls to bob, weave, shuffle, block, jab, or throw a variety of different power punches. Data used to model user motion may include data corresponding to motion, posture, hand position or the like. FIG. 1B illustrates embodiments of a camera field of view 114 and a 3-D orthogonal coordinate reference system defined within the field of view. In this example, user 106 is interacting with a dance exercise application in which the user is dancing to music. The movements of user 106 are captured by the capture device 110, which, in conjunction with computing environment 102, animates and controls the movements of an avatar on a display just like in the boxing example. Some of his movements may be gestures.

The origin of a 3-D orthogonal coordinate reference system is depicted in the center of the field of view of the capture device 110, which is located between the user 106 and his arm chair 118. A skeletal model as discussed below is derived from each captured image frame, and initially the skeletal model is represented in this camera-based coordinate system. This coordinate system is called camera-based because the position of the camera determines the field of view and the space is characterized using planes and normals defined with respect to the camera. The camera-based reference system is fixed. It does not move with the user.

Figure 1C:
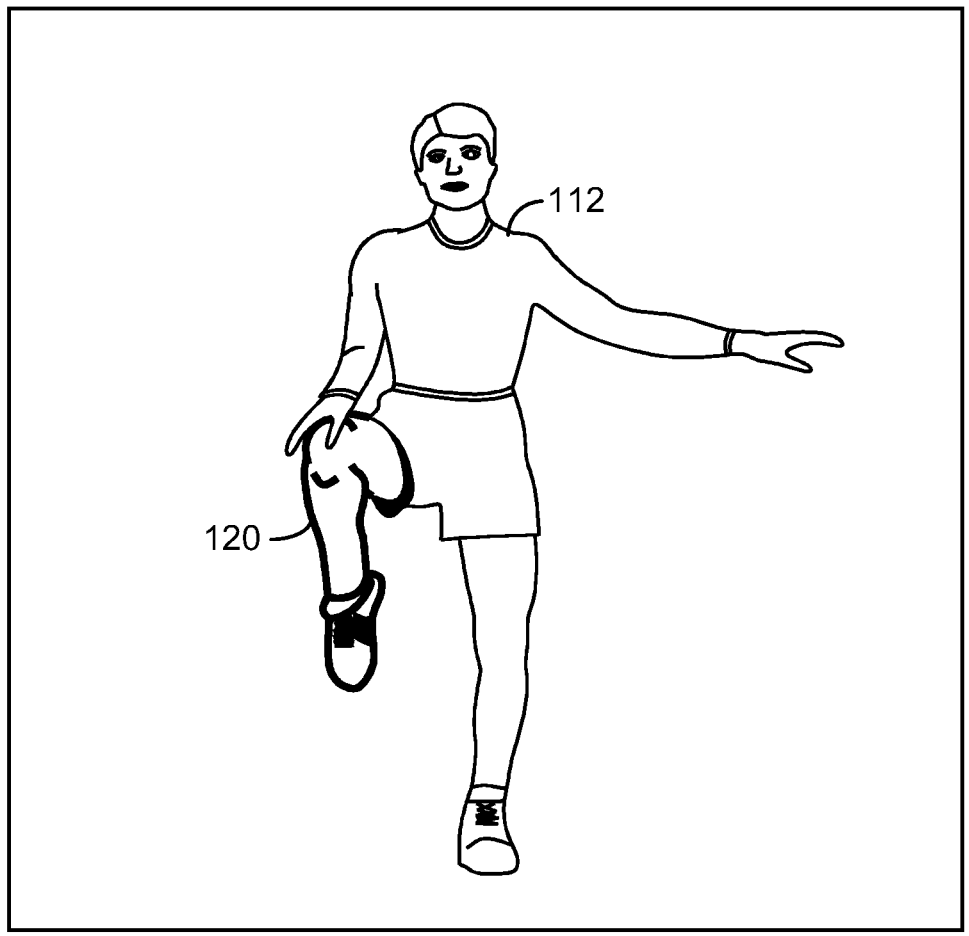
FIG. 1C is a diagram showing an example of a visually distinctive indicator providing feedback to a user on his performance.

FIG. 1C is a diagram showing an example of a visually distinctive indicator 120 displayed to a user on the user's player avatar 112 on audiovisual device 104 providing feedback to the user 106 on his performance. His right leg of the player avatar 112 is depicted via the visually distinctive indicator 120 on the audiovisual device 104 to provide visual feedback that the user's leg lift with his right leg is not meeting a standard, for example height, of a leg lift gesture of a model or the average performed by others using the dance exercise game.

Figure 2:
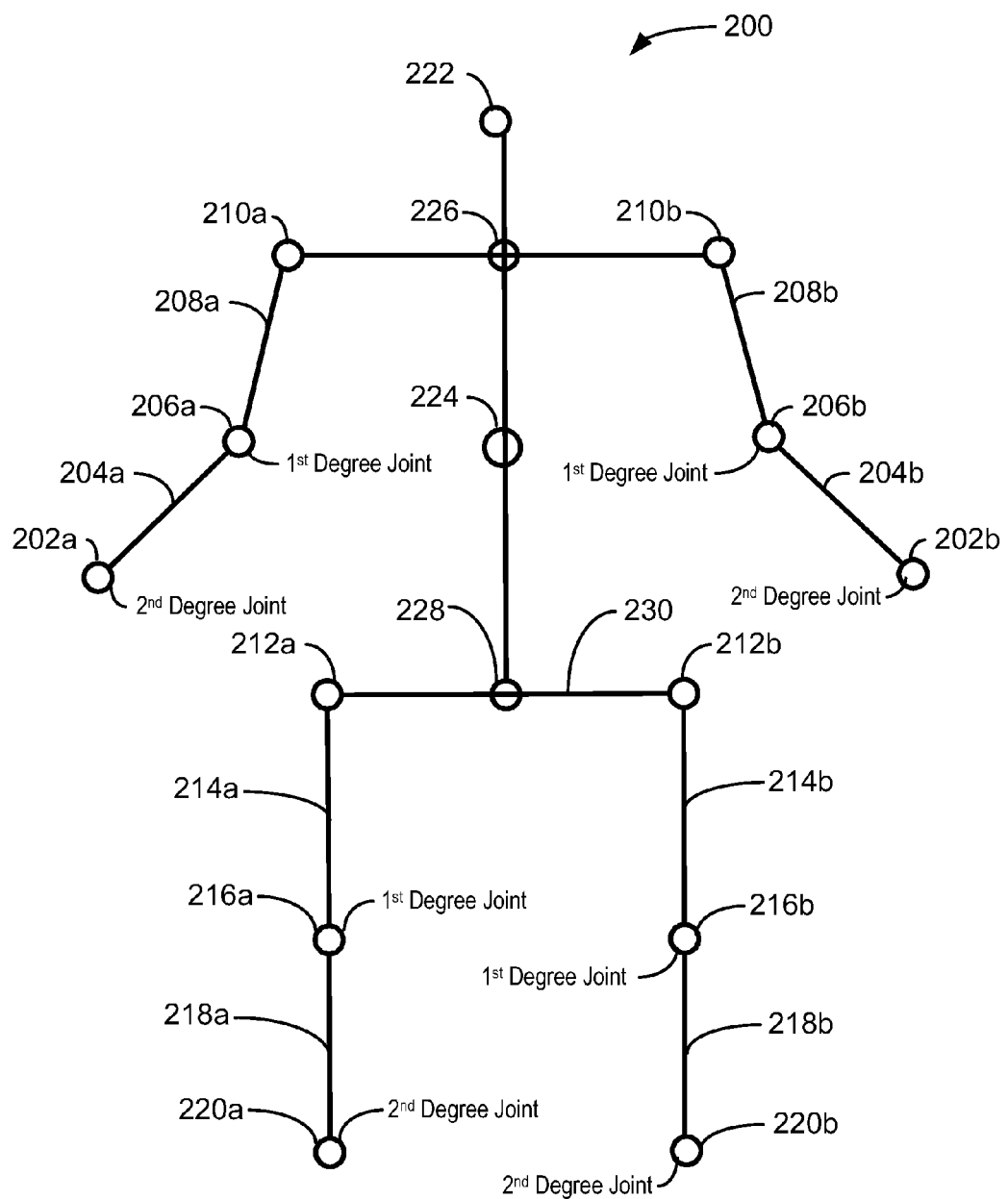
FIG. 2 is a diagram showing an example of a skeletal model of a user that can be used by one or more embodiments.

FIG. 2 depicts an example skeletal mapping of a user that may be generated from the capture device 110. In this embodiment, a variety of joints and bones are identified: each hand 202, each forearm 204, each elbow 206, each bicep 208, each shoulder 210, each hip 212, each thigh 214, each knee 216, each foreleg 218, each foot 220, the head 222, the mid spine 224, the top 226 and the bottom 228 of the spine, and the waist 430. Where more points are tracked, additional features may be identified, such as the bones and joints of the fingers or toes, or individual features of the face, such as the nose and eyes. It is understood that one or more of the points shown in FIG. 2 may be omitted and/or others may be added. Moreover, a skeletal mapping is one example of a computer model of a user, and other computer models are contemplated.

Each of the points in FIG. 2 may be described in 3-dimensional Cartesian space by an x, y and z coordinate in a frame of reference with respect to the capture device 110 (camera space). One consequence of this is that any absolute motion of a joint in this reference frame is to be computed. For example, referring again to FIG. 1B if the user 106 is moving in the frame of reference with his hand 106a straight down and stationary with respect to his body, that hand is nonetheless moving in camera space frame of reference. Time and processor resources are required to determine its movement in camera space relative to a prior frame.

It is an aspect of the present technology to conform, or transform, the frame of reference of body parts from camera space where absolute motion is measured to a frame of reference where motion is measured relative to an "upstream" joint. This frame of reference is referred to as a body space or body frame of reference. In one embodiment, an upstream joint is the next adjacent joint closer to the torso. So the upstream joint of the wrist is the elbow, and the upstream joint of the elbow is the shoulder; the upstream joint of the ankle is the knee, and the upstream joint of the knee is the hip.

Rigid-body transformation (e.g., translation and rotation) from the camera frame of reference to the body frame of reference provides the same information as to joint position, but does so in more efficient and low entropy manner. Continuing with the above example where the user is moving through the field of view with his hand 106a stationary at his side, while moving in absolute (camera) space, the user's hand is not moving relative to its upstream joint. Thus, tracking the user's hand in body space simplifies joint tracking from frame to frame. In general, tracking movement of joints relative to other joints results in smaller search space and data set, and faster processing and gesture recognition as explained below. It is a representation which is invariant to the group of similarity transformations (scaling, rotation, translation) in 3D.

As is also explained below, another aspect of the present technology is to treat the torso, including the shoulders and hips, as a rigid body. This good approximation allows the torso to be described with three angles, described below, relative to camera space, simplifying skeletal tracking.

The present technology may provide a target recognition, motion analysis and tracking system 100 with the ability to recognize and interpret relatively complex gestures, such as dance steps or the like. Moreover, prototype gesture data representative of specific dance steps or moves performed by experts may be employed in a training process and then used to classify steps performed by a user or to evaluate or rate the performance of a user based on user gesture data obtained by the capture device 110. According to the present technology, the data may be evaluated in an accurate, scalable and robust manner.

In an example embodiment, specific motions corresponding to dance steps are evaluated based on user input data relating to motion of at least some of the skeletal points shown in FIG. 2. The relative motion of these points is evaluated over some fixed period of time (for example, eight beats of music) and compared with stored prototype data representative of a catalog of specific prototype moves or steps. A determination may then be made regarding which specific dance step or move is being performed by a user. Distinct prototype steps or moves are referred to herein as motion classes. Further, the correlation of the user's measured movements and energy to the prototype data may be used to provide a score representing a quality of the user's interpretation of the specific dance move being performed.

Based on input data corresponding to the skeletal points shown in FIG. 2, a set of motion features may be inferred that enables effective recognition of dance gestures. An example embodiment may perform gesture recognition based on several specific objectives, which do not depend on a level of completeness or precision needed for re-rendering. The objectives include entropy reduction. To facilitate entropy reduction, wireframe joints may be expressed relative to their parent nodes, as in traditional joint-angle representations. Heuristically, this should reduce the entropy of a resulting multivariate time-series.

Another objective of an example embodiment is robustness in the ability to overcome data errors. Moreover, the present technology relates to providing data robustness for real-time depth sensors compared to motion capture systems. A first relevant factor is the existence of strong additive noise intrinsic to the sensing system that propagates through a skeletal tracking algorithm into the resulting skeleton data. A second relevant factor relates to the inference of occluded parts of the skeleton, which may thus be error-prone.

An example embodiment may provide invariance to input sensor orientation. Moreover, an embodiment may endeavor to maximize the invariance of the skeletal representation with respect to camera position.

Signal continuity and stability may be provided by orienting the coordinate axes used to compute relative positions so as to minimize the probability of signal discontinuities, e.g., gimbal lock. This objective is especially relevant when using normalized correlation for gesture detection.

Dimensionality reduction may be employed relative to the search space for classification while retaining the character of the motion. Compared to representations that focus on animation or motion capture, an example embodiment relates to computing features that may not be perfectly invertible.

The points of the human torso (defined by seven skeletal nodes 210a, 210b, 212a, 212b, 224, 226, 228 as illustrated in FIG. 2) rarely exhibit strong independent motion. Thus, the torso can be treated as a vertically elongated rigid body. Yet, due to the strong noise patterns in the depth sensing system, it may be observed that individual torso points, in particular shoulders and hips, may exhibit unrealistic motion that would desirably be limited rather than propagated by relative representation. Consequently, the torso may be treated as a rigid body with all of its points contributing to the estimate of its position. This estimate may then be used to represent the remainder of the human skeleton in relative manner.

The principal components for the torso points, i.e., a 3D orthonormal basis, may be computed as a result of applying principal component analysis (PCA) to the seven-by-three torso matrix. The first principal component u is aligned with the longer dimension of the torso. It may be canonically oriented (top-down) because in most dancing, it is not anticipated that the player's torso will stand upside-down relative to the sensor. In contrast, for the second principal component r, aligned with the line that connects the shoulders, the orientation is not so easily inferred, and here may be placed on the "left-right" skeleton orientation inferred by the skeletal tracking algorithm. Finally, the last axis of the orthonormal basis is computed as a cross product of the first two principal components, i.e., $t = u \times r$. The resulting basis $\{u, r, t\}$ may be referred to herein as the torso frame.

According to the subject technology, the torso frame provides a robust and reliable foundation for a coordinate system based upon the orientation of the human body. Although it is dependent upon camera position, points represented within a coordinate system that is derived from the torso frame may be fully invariant to the sensor. It reduces seven 3D trajectories of the original problem specification to a new set of signals whose aim is to describe only the 3D orientation of the resulting orthonormal basis. As set forth herein, a set of simple features is employed to intuitively and robustly describe torso's motion. Finally, it might be possible to compute the torso frame more accurately from the underlying depth-map silhouette. Moreover, the computational overhead of such an approach does not offer a favorable trade-off with respect to an ensuing minor improvement in recognition performance.

As shown in FIG. 2, joints adjacent to the torso may be identified as first-degree joints. Thus, first degree joints include elbows, knees, and the head. These points may be represented relative to the adjacent joint in the torso in a coordinate system derived from the torso frame. According to the present technology, LE (the left elbow), may be represented relative to LS (the left shoulder). First, the torso frame, $\{u, r, t\}$, may be translated to LS. A spherical coordinate system may be constructed such that the origin is centered at LS, the zenith axis is u, and the azimuth axis is r. Then, LE's position may be described by its radius R (the distance of LE from the origin), its inclination $\theta$ (the angle between u and $\overrightarrow{(LS,LE)}$), and its azimuth $\phi$ (the angle between r and $\overrightarrow{(LS,LE_p)}$) where $LE_p$ is the projection of LE onto the plane whose normal is u).

Since the length of the humerus bone is normalized and constant, the radius R may be ignored for any further consideration. Thus, using this representation model, each first-degree joint is represented with two angles $\{\theta, \phi\}$.

Second-degree joints may be denoted as the tips of the wireframe extremities. Thus, second-degree joints include the hands and the feet. The most descriptive vector associated with a second-degree joint is the bone that connects the adjacent first-degree joint and its adjacent torso joint. For example, a vector b protruding out of the humerus bone is a good potential candidate for the zenith direction of a spherical coordinate system with an origin in the left elbow, LE. The joint of the left hand may be denoted as LH. Then, LH's position is described by its radius R (the distance of LH distance from the origin), its inclination $\theta$ (the angle between b and $\overrightarrow{(LE,LH)}$), and its azimuth $\phi$ (the angle between $r_p$, the projection of r onto the plane S whose normal is b, and $\overrightarrow{(LE,LH_p)}$ where $LH_P$ is the projection of LH onto S).

Since the length of the forearm bone is normalized and constant, the radius R may be ignored. Thus, a model may represent each second-degree joint using two angles $\{\theta, \phi\}$. The consequences are the same as those of first-degree joints with one notable difference. While the inclination $\theta$ for second-degree joints is an exceptionally robust descriptor, their azimuth is not. Because the origin of the spherical coordinate system is not part of the rigid body that defines the torso frame, the orientation of r is dependent upon the torso's orientation and introduces noise into $\phi$. It has been confirmed that this effect is not significant and does not pose a significant problem with respect to the remaining operations of the classifier.

The vectors b and r could be oriented in such way that $b \cdot r = 1$, thus making the projection $r_p$ a point. While this is unlikely to occur, any small angle between b and r is likely to pose increased levels of noise due to the instability of $r_p$. Although this issue could be resolved in several ways, the case $b \cdot r \approx 1$ has been observed to occur infrequently when r is chosen as an azimuth reference. Instead of r, the vectors u or t or any linear combination thereof could be used with a wide range of impact on final performance. The selection of r has been observed to attenuate the issue sufficiently.

In an example embodiment, an angular wireframe model is represented by eight pairs of angles $\{\theta, \phi\}$ for each set of the first-degree and four second-degree joints, as well as the rotation matrix of the torso frame with respect to the camera's coordinate frame. In one example embodiment, the head point is ignored, so that there are only four first degree points.

To parameterize the rotation matrix, "proper" Euler angles may be considered, but evidence has shown that the "proper" Euler angle values are unpredictably prone to gimbal lock. This problem can be avoided using quaternions, but quaternions have been observed to yield rather unintuitive time-series data. In an example embodiment, Tait-Bryan angles (i.e., yaw, pitch and roll) are used. If a skeletal tracking algorithm does not support tracking a player who is spinning, Tait-Bryan angles can be oriented so as to rarely introduce gimbal lock. This improves the performance of the normalized correlation scheme in classifier according to the present technology.

A set of feature time-series obtained from skeletal motion may be obtained as $f=\{f_i(t), i=1 \ldots 19\}$. It may be noted that this formulation reduces the complexity of input is from a collection of 16 3D curves to a set of 19 1D vectors. This simplification is relatively substantial from a standpoint of computational efficiency, and has been observed to result in infrequent, negligible loss of information. Consequently, these features are geared for classification because they represent motion in relative manner that facilitates aligned, one-dimensional comparison.

Figure 3:
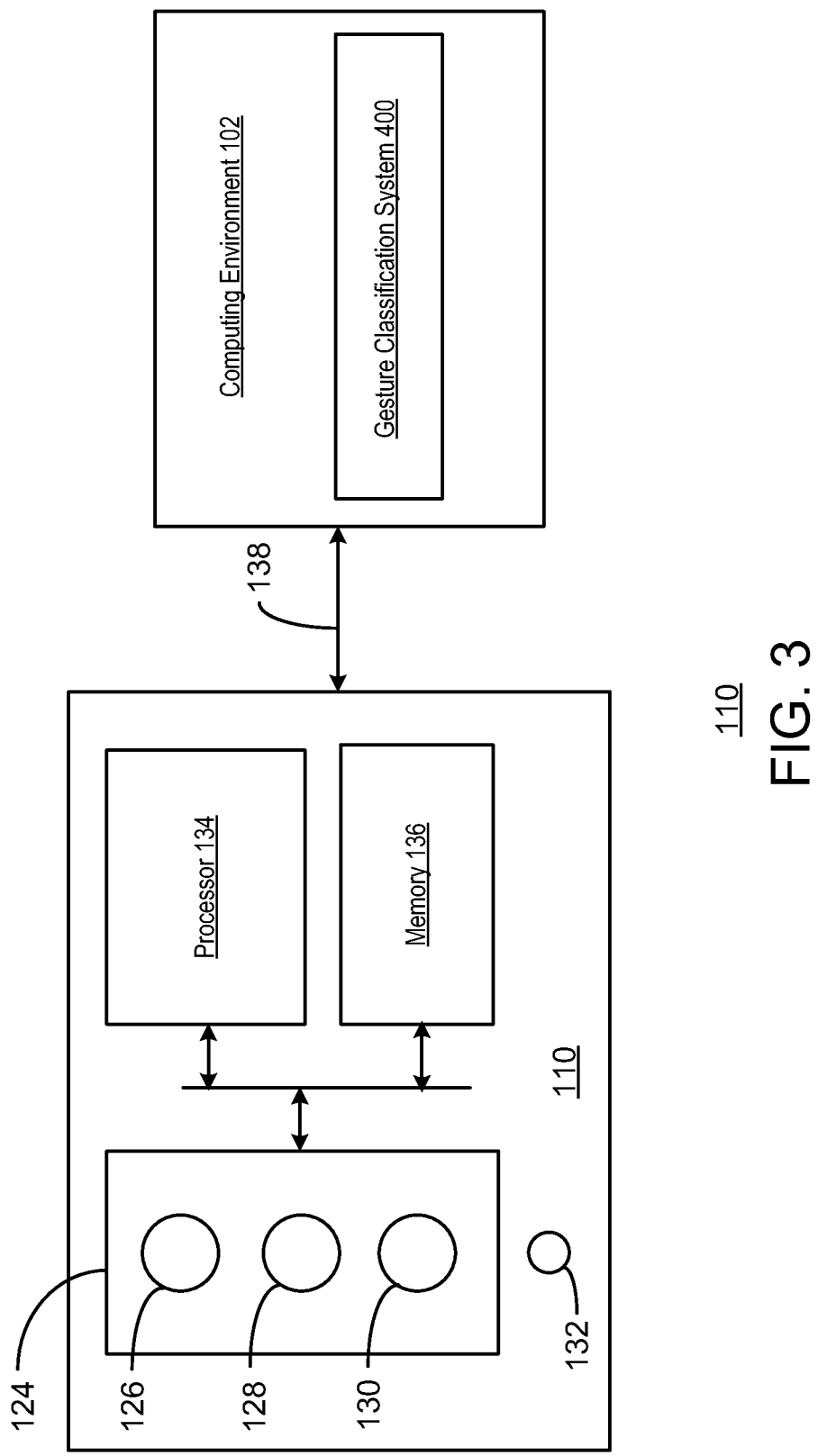
FIG. 3 is a diagram showing an example embodiment of a capture device that may be used in an embodiment of a target recognition, analysis, and tracking system.

FIG. 3 is a diagram showing an example embodiment of the capture device 110 that may be used in the target recognition, analysis, and tracking system 10. Further details relating to a capture device for use with the present technology are set forth in one or more of the above co-pending patent applications. However, in an example embodiment, the capture device 110 may be configured to capture video having a depth image that may include depth values via any suitable technique including, for example, time-of-flight, structured light, stereo image, or the like. According to one embodiment, the capture device 110 may organize the calculated depth information into "Z layers," or layers that may be perpendicular to a Z-axis extending from the depth camera along its line of sight.

As shown in FIG. 3, the capture device 110 may include an image camera component 124. According to an example embodiment, the image camera component 124 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 3, according to an example embodiment, the image camera component 124 may include an IR light component 126, a three-dimensional (3-D) camera 128, and an RGB camera 130 that may be used to capture the depth image of a scene. For example, in time-of-flight analysis, the IR light component 126 of the capture device 110 may emit an infrared light onto the scene and may then use sensors (not shown) to detect the backscattered light from the surface of one or more targets and objects in the scene using, for example, the 3-D camera 128 and/or the RGB camera 130.

According to another embodiment, the capture device 110 may include two or more physically separated cameras that may view a scene from different angles, to obtain visual stereo data that may be resolved to generate depth information.

The capture device 110 may further include a microphone 132. The microphone 132 may include a transducer or sensor that may receive and convert sound into an electrical signal. According to one embodiment, the microphone 132 may be used to reduce feedback between the capture device 110 and the computing environment 12 in the target recognition, analysis, and tracking system 10. Additionally, the microphone 132 may be used to receive audio signals that may also be provided by the user to control applications such as game applications, non-game applications, or the like that may be executed by the computing environment 12.

In an example embodiment, the capture device 110 may further include a processor 134 that may be in operative communication with the image camera component 124. The processor 134 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 110 may further include a memory component 136 that comprises one or more tangible, machine-readable storage media. The memory component may store the instructions that may be executed by the processor 134, images or frames of images captured by the 3-D camera or RGB camera, or any other suitable information, images, or the like. According to an example embodiment, the memory component 136 may include random access memory (RAM), read only memory (ROM), cache, Flash memory, a hard disk, or any other suitable storage component. As shown in FIG. 3, in one embodiment, the memory component 136 may be a separate component in communication with the image camera component 124 and the processor 134. According to another embodiment, the memory component 136 may be integrated into the processor 134 and/or the image camera component 124.

As shown in FIG. 3, the capture device 110 may be in communication with the computing environment 12 via a communication link 138. The communication link 138 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 110 that may be used to determine when to capture, for example, a scene via the communication link 138.

Additionally, the capture device 110 may provide the depth information and images captured by, for example, the 3-D camera 128 and/or the RGB camera 130, and a skeletal model that may be generated by the capture device 110 to the computing environment 12 via the communication link 138. A variety of known techniques exist for determining whether a target or object detected by capture device 110 corresponds to a human target. Skeletal mapping techniques may then be used to determine various spots on that user's skeleton, joints of the hands, wrists, elbows, knees, neck, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may track the skeletal model and render an avatar associated with the skeletal model. The computing environment may further determine which controls to perform in an application executing on the computer environment based on, for example, gestures of the user that have been recognized from the skeletal model. For example, as shown, in FIG. 3, the computing environment 12 may include a gesture classification system 400. The gesture classification system 400 is explained hereinafter with reference to FIG. 4, but may in general include a collection of gesture filters, each comprising information concerning a gesture that may be performed by the skeletal model (as the user moves). The data captured by the cameras 128, 130 and capture device 110 in the form of the skeletal model and movements associated with it may be compared to the gesture filters in the gesture classification system 400 to identify when a user (as represented by the skeletal model) has performed one or more gestures. Those gestures may be associated with various controls of an application. Thus, the computing environment 12 may use the gesture classification system 400 to interpret movements of the skeletal model and to control an application based on the movements. In an example embodiment, gesture data corresponding to user input or activity may be compared to stored expert gesture data to determine whether a user has successfully performed a specific activity, such as a particular dance move.

An example embodiment of the present technology employs an angular skeleton representation to improve overall system performance. It is used to map the skeleton motion data to a smaller set of features (each a scalar time series) that can be robustly estimated from the noisy input and yet retains the salient aspects of the motion. The aim is to reduce the overall entropy of the signal, remove dependence on camera position, and avoid unstable parameter configurations such as near gimbal lock. The approach is to fit the full torso with a single frame of reference, and to use this frame to parameterize the orientation estimates of both the first- and second-degree limb joints.

A cascaded correlation-based max-likelihood multivariate classifier may be employed in an example embodiment of the gesture classification system 400. During a training process, the classifier builds a statistical model for each gesture class based upon both prototype data (i.e., an oracle) and a database of gesture instances performed by a group of subjects with a wide range of dancing skills. At runtime, the classifier correlates the multivariate input buffer with the prototype gesture model for each class and constructs a per-class log-likelihood score. Then, it uses the scores to rank all classes and performs rounds of logistic regression tests among the top classes to identify the winning match.

An example embodiment may operate under an assumption that skeletal input data to the classifier represents dancing that adheres to a beat pattern. Thus, the classifier may ignore actual time and resample the input time-series so that within a fixed period (e.g., eight beats), a certain number of frames of skeletal motion (e.g., 120) are created. In this manner, a frame rate of about 30 frames per second (fps) may be provided. The classifier may be relatively invariant to the pace of the beat in different musical pieces. In addition, the need to unwarp and synchronize different instances of players dancing the same gesture may be reduced. Another assumption that may be made is that each beat of music played during the game is labeled. Beat detection algorithms could be used in this setting, as well.

In one example embodiment, an assumption is made that a player is allowed to dance only a limited, well-defined, and known set $M$ of K moves that span over eight beats. In this manner, on-line learning scenarios that could be detrimental to overall error rates are avoided. Incoming frames with skeletal motion data may be stored in a first-in, first-out (FIFO) buffer. Prior to classification, the contents may be resampled at a rate of 120 frames per eight beats. The classifier finds the best matched class in $M$ and finally, responds with a report that outlines how well the player danced the matched gesture.

A space-time contract-expand distance metric may employ dynamic time-warping with exponential scaling of time-space to achieve robust comparison of the input gesture with the matched prototype (oracle). An example embodiment performs well in spite of noise present in the skeletal motion data and the fact that humans exhibit a wide spectrum of ability to replicate a specific motion.

Figure 4:
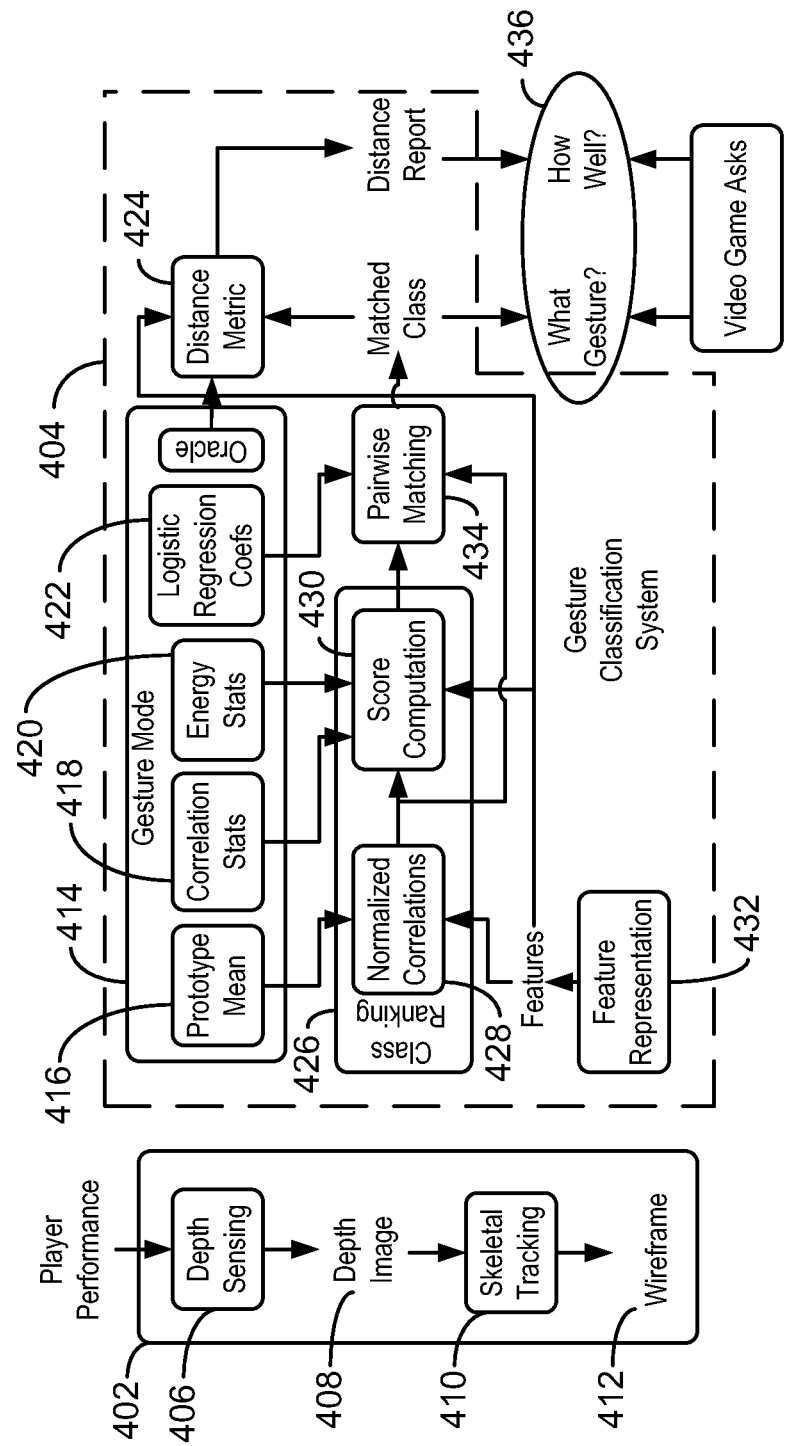
FIG. 4 is a block diagram showing an example embodiment of a gesture classification system that may be used in an embodiment of a target recognition, analysis and tracking system.

FIG. 4 is a block diagram showing an example embodiment of a gesture classification system 400 that may be used in an embodiment of a target recognition, motion analysis and tracking system. The example gesture classification system 400 includes a player performance component 402 and a gesture classification component 404. The player performance component 402 acquires input regarding a user or player and the gesture classification component 404 analyzes the data and provides classification information regarding the user input.

The example player performance component 402 includes a depth sensing module 406, which may provide a depth image 408. As explained herein, the depth image 408 may represent information regarding the 3D positioning of a player within a viewing frame acquired by the capture device 110. A skeletal tracking module 410 acquires information about relative motion of various portions of the player's body. The skeletal tracking data, which may be referred to as wireframe data 412, may be of the form described herein with respect to FIG. 2.

The gesture classification component 404 comprises a gesture model component 414. The gesture model component 414 includes a prototype mean module 416, which provides data relating to a library of prototype features. The data provided by the prototype mean module 416 has been trained using data corresponding to a prototype motion feature (oracle data) and a wide range of sample data representing user motion features. Moreover, the data provided by the prototype mean module 416 incorporates "average" player data that may be used to classify actual player gestures (represented as user data motion features) as corresponding to a particular dance move or step.

In a training operation, a model of each choreographed gesture may be built relying on a training set, $F_T=\{f_j, j=1 \ldots L\}$. The training set comprises a collection of L recordings of subjects dancing this gesture. Subjects of various skill may participate in the recordings, each one typically producing a handful of recordings per gesture.

The model developed in the training operation may also employ a prototype motion feature representative of an oracle, $f_o$, which may comprise a recording of a gesture performed by a professional dancer. This recording is considered the definition of the gesture. A single or small handful of recordings may be considered for each oracle representation, mainly because professional dancers usually repeat a specific gesture so accurately that most of the variation in the recordings stems from sensor noise.

In order to produce an expected average trajectory of a dancer for each individual feature, denoted as a prototype mean, the training data is aligned with respect to the prototype motion feature (i.e., the oracle) by computing a circular normalized cross-correlation between $f_o$ and each individual $f_j$. A normalized circular cross-correlation operation is a mathematical operation that is used to identify similarities of two waveforms given a time offset between the waveforms.

Cross-correlation is a technique that may be used to identify a shorter known pattern within a larger set of data (such as a waveform).

In an example embodiment, circular normalized cross-correlation c of two vectors u and v is computed as:

$$blackc(u, v) \equiv u \star v \equiv \frac{(u(-t) - \bar{u}) * (v(t) - \bar{v})}{\|u - \bar{u}\|_2 \|v - \bar{v}\|_2}, \quad (1)$$

where $\bar{u}$ denotes the mean of u. Un-normalized circular cross-correlation of two vectors u and v can be computed as $F^{-1}[F(u) \cdot F(R(v))]$, where R( ) denotes reflecting the time-series vector and F is the discrete Fourier transform. Un-normalized circular cross-correlation is computed for each feature. In order to account for the synch of the entire body, the cross-correlation vectors are summed for all features into a single vector $\hat{c}_{j,o} = \Sigma_i c_{j,o}^i$. The phase offset of the two vectors equals:

$$\tau_j = \underset{t}{\mathrm{argmax}} \hat{c}_{j,o}(t), \quad (2)$$

Thus, all features are phase-shifted in $f_j$ for $-\tau_j$ samples in order to align the $f_j$ recording with $f_o$.

A prototype mean may be defined for a specific feature as $$f_{m,i} = \frac{1}{L} \sum_{j=1}^{L} f_{j,i}(-\tau_j).$$

The gesture prototype may be denoted as $f_m$. The relation of $f_m$ and $f_o$ is that $f_m$ represents the motion of an average subject dancing the gesture, while $f_o$ is that of the expert. Typically, they are similar in shape but the prototype mean is often attenuated in amplitude because skilled dancers usually emphasize movement for overall appeal.

Next, a model that captures the in- and out-of-class correlation statistics may be assembled. For each recording j in $F_T$ and feature i, $$c_{j,m}^i = f_{m,i} \star f_{j,i}, \quad \tau_j' = \underset{t}{\mathrm{argmax}} \sum_i c_{j,m}^i(t)$$

may be computed. For each feature i, a histogram of correlation values across $\{c_{j,m}^i(\tau_j'), j=1 \ldots L\}$ may be assembled. Since L is typically small, a simple kernel density estimation (KDE) filter, which smoothes the histogram using a gaussian kernel, may be applied. A histogram curve for a specific feature i may be stored as a lookup table, $p_i(c)$, where $-1 \leq c \leq 1$ is the correlation argument. For a particular feature, the lookup table thus returns the likelihood that, given a correlation of the prototype mean and the input (i.e., an input data motion feature), the input gesture belongs to this specific class. Similarly, statistics may be collected on out-of-class correlations and a corresponding lookup table $q_i(c)$ may be created. These two tables may be combined to produce a scoring function for a specific correlation value. One example of a scoring function is denoted as $h_i(c) = 2 \log(p_i(c)) - \log(q_i(c))$. The fact that skilled dancers, i.e., dancers who produce high correlations against prototype means, are typically infrequent in $F_T$, may result in low $p_i(c)$ for high c. In that case, their scores are essentially penalized for their dances being "too good". To correct this anomaly, prior to applying the KDE filter, the histogram counts for high correlations may be adjusted.

Normalized cross-correlation as a detection technique is effective in matching shapes, but not as effective in matching their amplitude. Rather than using Euclidean distance or correlation without normalization, an example embodiment may employ an additional distance metric, the average signal energy, as a complement to normalized correlation. Thus, for each feature $f_i$ of an in-class gesture instance, the energy-level relative to the prototype motion feature may be computed as: $\alpha_i = \|f_{o,i}\| - \|f_i\|$, and a histogram $e_i^+(\alpha)$, $-4\pi^2 \leq \alpha \leq 4\pi^2$ over the energy-levels of all instances in $F_T$ may be built. A KDE filter, may be applied. Similar to the correlation histogram $h_i(c)$, the same statistic for out-of-class instances, $e_i^-(\alpha)$ may be computed. They may be combined as $e_i(\alpha) = 2 \log(e_i^+(\alpha)) - \log(e_i^-(\alpha))$. Finally, $e_i(\alpha)$ may be compensated for the fact that skilled dancers, who are not common in the benchmark employed, may have wider range of motion and thus, increased energy level of their recordings. The latter adjustment may be performed by increasing the histogram counts of $e_i^+(\alpha)$ for cases of low $\alpha$. Thus, for a specific gesture and feature i, the present technology encompasses a three-tuple $\{f_{m,i}, h_i, e_i\}$ that comprises the prototype mean $f_{m,i}$, the correlation histogram $h_i(c)$, and the energy-level histogram $e_i(\alpha)$.

The gesture model component 414 also includes a correlation statistics module 418 and an energy statistics module 420. As set forth herein, correlation statistics and energy statistics may be used by the gesture classification system 400 to classify a user's dance moves as well as to assign a score that represents quality of the dance moves.

A logistic regression coefficients module 422 may be included in the gesture model component 414. As explained herein, logistic regression may be used when classifying dance moves to select between prototype moves that have common features. Moreover, logistic regression data may be used to fine tune a classification process according to the present technology to select between prototype motion features that are relatively close to each other.

The gesture model component 414 may include a class ranking component 426. The class ranking component may be used in the process of selecting a matching prototype motion feature for given data representative of a user input motion feature. In particular, the class ranking component 426 may be used to rank the prototype motion features stored in a prototype motion feature database based on a probability that given user input data is a match for each of the prototype motion features. Moreover, a prototype motion feature that more closely resembles the given user input data may be assigned a higher match probability by the class ranking component 426. To perform this functionality, the class ranking component 426 may comprise a normalized correlation module 428 and a score computation module 430.

The class ranking component 426 receives data from the player performance component 402 via a feature representation module 432. The feature representation module 432 may provide data relating to specific features, which represent subsets of an entire motion feature of user data.

As explained herein, an example embodiment of a gesture recognition system, once trained, may be employed to perform real-time classification of user motion, for example, in the context of a video game. In such a case, the input to the classifier is a stream of skeletal wireframes that are converted to feature sets. Let $x = \{x_i, i=1 \ldots 19\}$ denote the input stream of 19 features, each N samples long. For each gesture model $g = \{\{f_{m,i}, h_i, e_i\}, i=1 \ldots 19\}$ in the associated prototype motion feature database, its score may be computed using the following methodology.

First, a normalized cross-correlation operation is performed. In this operation, each input feature, $x_i$, is cross-correlated with its corresponding prototype mean, $f_{m,i}$. This is a relatively computationally demanding operation of the gesture recognition classifier because radix-2 Fast Fourier Transforms (FFTs) of length N are computed in O(N log(N)) operations. Next, a max-likelihood score is determined. In an example embodiment, corresponding histogram scores may be looked up and summed across all features. The following formula may be used to perform the summing:

$$s = \frac{1}{19} \sum_{i=1}^{19} [h_i(c_i) + e_i(\alpha_i)]. \quad (3)$$

After the max-likelihood score is determined, a phase-offset operation may be performed. The phase shift $\tau$ of the input relative to the prototype mean may be identified as:

$$\tau = \underset{t}{\mathrm{argmax}} s(t) \quad (4)$$

The phase shifts are distinct for each class.

The classification score for each gesture class k in the database is $s_k(\tau_k)$. These scores may be used to rank all classes, with the best match having the highest score.

A pairwise matching component 434 may be included in the gesture classification component 404. In the example embodiment shown in FIG. 4, the pairwise matching component 434 collects inputs from the normalized correlation module 428, the score computation module 430 and the logistic regression coefficients module 422. Based on this information, the pairwise matching component 434 provides an output identifying a prototype motion feature from the prototype motion feature database that most closely matches the user input data received from the player performance component 402. The prototype motion feature that most closely matches the user input data is identified with the legend "matched class" in FIG. 4.

The ranking classifier can be improved because some classes are often similar in motion to the point where their prototype means across all features are equivalent except for one. One can view all instances of two gesture classes as a collection of points in a locality of a large 2(19+19)-dimensional space. Due to acquisition noise and the variety of ways in which humans can play a certain gesture, two classes whose prototype means are nearly identical (across all but very few features) may have intersecting volumes if, for example, a multidimensional sphere is used to contain and detect all points of a specific class. Since the disambiguation of the two classes is more nuanced and selectively dependent upon features, there exists need to better distinguish neighboring classes using an advanced, pairwise matching tool.

Weighting of likelihoods in Equation 3 is one example of a way to improve the classification agility. The "optimal" weights may need to be recomputed and are likely distinct for each pairwise comparison of gesture matches. Thus, it may be desirable to compute these weights using logistic regression and deploy the trained coefficients at classification as described herein.

By way of example, logistic regression may be performed for the two top-tiered classes with highest $s(\tau)$ scores, e.g., indexed $k_1$ and $k_2$. Binary classification may be performed by computing:

$$blackPr(C = k_1 \mid x) = 1/(1 + \exp(-\gamma)), \quad (5)$$

$$\gamma = \sum_{i=1}^{19} w_{h,i}^{(k_1,k_2)} h_{k_1,i}(c_{k_1,i}) + w_{e,i}^{(k_1,k_2)} e_{k_1,i}(\alpha_{k_1,i}) +$$

$$\sum_{i=1}^{19} w_{h,i}^{(k_2,k_1)} h_{k_2,i}(c_{k_2,i}) + w_{e,i}^{(k_2,k_1)} e_{k_2,i}(\alpha_{k_2,i}),$$

where all weights have been trained using logistic regression. In case $Pr(C=k_1|x) \geq 0.5$, class $k_1$ would be denoted as the best match, otherwise $k_2$. The process of pairwise matching the "winner class" with the next "runner-up class" could be repeated recursively, although the likelihood that a class deep on the $s(\tau)$-list "wins" rapidly declines. Thus, an example embodiment may employ a 3-deep sequence of pairwise class-comparisons via logistic regression.

A gesture model $\{f_{m,i}, h_i, e_i\}$ may therefore be augmented with another data field, the coefficient matrix for logistic regression $W = \{\{w_{h,i}^{(k_r,k_q)}, w_{e,i}^{(k_r,k_q)}, w_{h,i}^{(k_q,k_r)}, w_{e,i}^{(k_q,k_r)}\} \mid i=1 \ldots 19, r=1 \ldots K, q=1 \ldots K\}$, where K is the number of gesture classes. Since the size of assets required for classification is proportional to $O(K^2)$, for large K the size of the classification database would grow prohibitively. For most gesture classes, it is noted that the differences among them are large enough that the scoring function in Equation 3 is sufficient to disambiguate them. In training, "similar" gestures may be identified and weighting matrices may be trained only for these sparse pairs. The density of pairs in the complete K×K matrix depends on the similarity of the gesture motion classes.

A classifier of a gesture recognition system according to the present technology may manifest a number of interesting attributes. For example, the length of the input buffer does not necessarily equal the length of the class prototypes. Thus, shorter input sequences can be matched using the same algorithm. Only the normalization parameters of the cross correlation need to be adapted.

A gesture recognition algorithm according to the present technology may return as a side-effect the phase shift with respect to the prototype of the matched class. This information may be useful to synchronize the user's dancing pattern with the gaming platform.

Errors reported by an exemplary gesture classification system may be benign, in particular, for short input buffers. One characteristic of such a classifier is that it may return the best-matched class within the entire gesture database, as well as phase-shift within its prototype mean. Therefore, in scenarios where an avatar renders the player's motion, errors may pass unnoticed due to short-spanned cross-class similarities.

The user input data is provided to a distance metric module 424, which may also receive input from the gesture model component 414 and information relating to the matched class from the pairwise matching module 434. The distance metric module 424 may provide a distance report as output representing a measure quality (or "goodness") of the dance move performed by the user.

Once the best-matched motion class has been identified, a remaining question relates to the quality of the user's move (as represented by a user data motion feature) relative to the matched prototype motion feature. Comparison with respect to the prototype mean (including the score obtained by correlation with it) may be misleading as it outlines how well the player performed versus the average rather than the expert dancer. On the other hand, besides having a single scoring number, it may be desirable to provide a report that outlines how "well" the game player danced per joint. To resolve this problem, it may be desired to obtain motion recordings labeled for artistic appeal, and to learn a regression model on this dataset that replicates the human expert. Even then, it may be arguable how consistent human labeling is. To avoid the semantic nature of grading body motion, the discrepancy between the relative motion of the current actor and the expert may be measured.

According to the present technology, the feature sequence of the player may be globally aligned using the phase-shift provided by the classification method. Subsequently, dynamic time warping may be used to measure the discrepancy of the two signals considering the possible local misalignments. To overcome the outliers due to the noise it may be desirable to employ a robust cost at the computation of dynamic time warping, defined as:

$$d(x, y) = \begin{pmatrix} 1 - \exp(-(x-y)^4/\sigma^2), \text{ if } |x-y| < \delta \\ 1 - \exp(-\delta^4/\sigma^2) \end{pmatrix} \quad (6)$$

where $\sigma$ is a parameter that controls the amount of deviation from the expert's performance allowed and $\delta$ is a threshold minimizing the effect of outliers.

This metric may be parameterized to adjust to different motion accuracy standards along space and time by tightening and relaxing $\sigma$ and $\delta$. It has been observed to be a relatively effective detector when computed against all oracles. Nonetheless, its computational complexity may be too large to allow exploration of per-class applications.

Information may be provided by the gesture classification component 404 via a gesture classification interface 436. The information may relate to identifying a dance move or step performed by the user (represented by the legend "What gesture?" in FIG. 4) and to evaluating a quality of the dance move or step (represented by the legend "How well?" in FIG. 4. Moreover, the gesture classification interface 436 may be used to transfer information from the gesture classification component 404 to a video game multimedia console (see FIG. 12) or a computer system (see FIG. 13) that hosts the gesture classification system 400.

Figure 5:
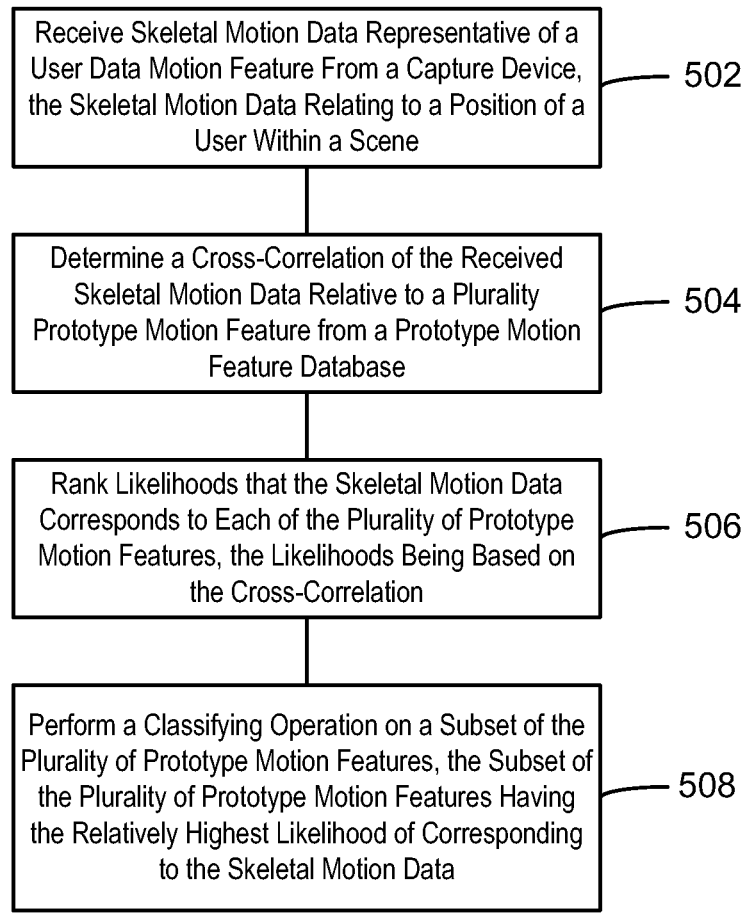
FIG. 5 is a process flow diagram showing an example method of motion recognition according to the present technology.

FIG. 5 is a process flow diagram showing an example method 500 of motion recognition according to the present technology. The method 500 may be performed by software executing on one or more processors such as the processor 134 of capture device 110, the CPU 1202 (FIG. 12) or the processing unit 1376 (FIG. 13) of the computing environment 12 for a target recognition, analysis tracking and tracking system 10.

At block 502, frames of skeletal model data are received from the capture device 110 representing a human body in a three-dimensional space with respect to the fixed camera-based 3-D coordinate reference system. Optionally, the size of bones in the sets of skeletal motion data may be normalized. In particular, different users may be of different sizes, with limbs and torsos of different sizes.

According to the present technology, each of the skeletal points shown in FIG. 2 may have its own input buffer that receives user data as a user performs dance moves. A single frame or instance of user data obtained at the same time for each of the skeletal points shown in FIG. 2 may be referred to herein as a user data motion feature. Based on the user data motion features obtained, a gesture database that stores a set of prototype motion feature data corresponding to a variety of gestures such as dance moves performed by experts may be consulted to evaluate the performance of the user. The database may be referred to as a prototype motion feature database.

As shown at block 504, a cross-correlation operation may be performed for each user data motion feature relative to the set of prototype motion features in the prototype motion feature database. In performing the cross-correlation operation, a cross-correlation vector may be formed using each of the features or skeletal data points shown in FIG. 2. A circular cross-correlation operation may serve to align the phase of user data gathered as a user plays a game with prototype data stored in a database within the game. For example, a frame of user data may be cross-correlated with mean data obtained by performing training using input data and expert prototype data. The circular cross-correlation operation may be performed using FFTs.

In an embodiment, the circular cross-correlation may comprise a normalized circular cross-correlation operation. A normalized circular cross-correlation takes into account that factors such as background noise may differ with respect to user data and prototype data. Further, the cross-correlation may be a normalized circular cross-correlation. The cross-correlation operation may enhance the ability of a motion recognition model to identify a particular prototype motion feature in the prototype motion feature database that corresponds to a given user data motion feature.

Data from input buffers for each of the skeletal points shown in FIG. 2 may be evaluated individually for each prototype motion feature in the prototype motion feature database. Moreover, a closest offset for alignment of the input buffer data may be found for each of the prototype motion features individually.

At block 506 of the example embodiment shown in FIG. 5, a probability or likelihood is determined based on the cross correlations that each of the set of prototype motion features is a match for the input skeletal motion data. The prototype motion features that most resemble the input skeletal motion data will be determined to have higher likelihoods of matching. The probabilities or likelihoods thus determined are used to rank the set of prototype motion features based on which is most likely to match the input skeletal motion data. In an example embodiment, block 506 represents the first step in a cascaded process of selecting a best match from the prototype motion feature database.

The probability may comprise a log-probability that represents the probability in logarithmic scale that a given user data motion feature actually corresponds to each of the prototype motion features in the prototype motion feature database. Log-probability is used instead of pure probability for two reasons: i) rescaling the [0,1] interval of probabilities to [-infinity, 0] which is more proper for classification, and, ii) decoupling the influence of each individual feature assuming that the features form a naïve Bayesian network.

The log-probabilities may be summed and reported for each motion class separately. As explained herein, a motion class is represented by each of the samples in the prototype motion feature database. Motion classes may be sorted based on the resulting scores.

At block 508, a classifying operation is performed using the ranking of the prototype motion features. This classifying operation may be thought of as the second step in the cascaded process of selecting a best match. In an example embodiment, the classifying operation may be performed on the two (perhaps three) prototype motion features having the highest likelihood of matching the input skeletal motion data. Numerous techniques may be used to perform the classifying process. For example, logistic regression may be applied to separate between pairs of gesture classes. In particular, logistic regression may be used to differentiate between candidate prototype motion features that are similar in some respects but that differ in more subtle respects. In addition to logistic regression, other types of binary classification based on input data may be applied to differentiate between candidate prototype motion features. Examples of alternative binary classification strategy include linear discriminant analysis and SVM analysis, among others.

The gesture performed by the user may be considered to be a match with the prototype motion feature having the highest score in this analysis. Moreover, the detected gesture (i.e., the gesture identified as having the highest likelihood of matching any of the prototype motion features) may correspond to a particular dance step or portion thereof represented by the prototype motion feature.

After a prototype motion feature that most closely resembles a given user data motion feature is selected, a corresponding dance style being performed by the user may be identified. For example, the detected user data may be tagged in the prototype motion feature database as being from a specific dance style, such as a waltz, a rumba or a foxtrot. The detected dance style may be presented to the user as part of a game context.

Figure 6:
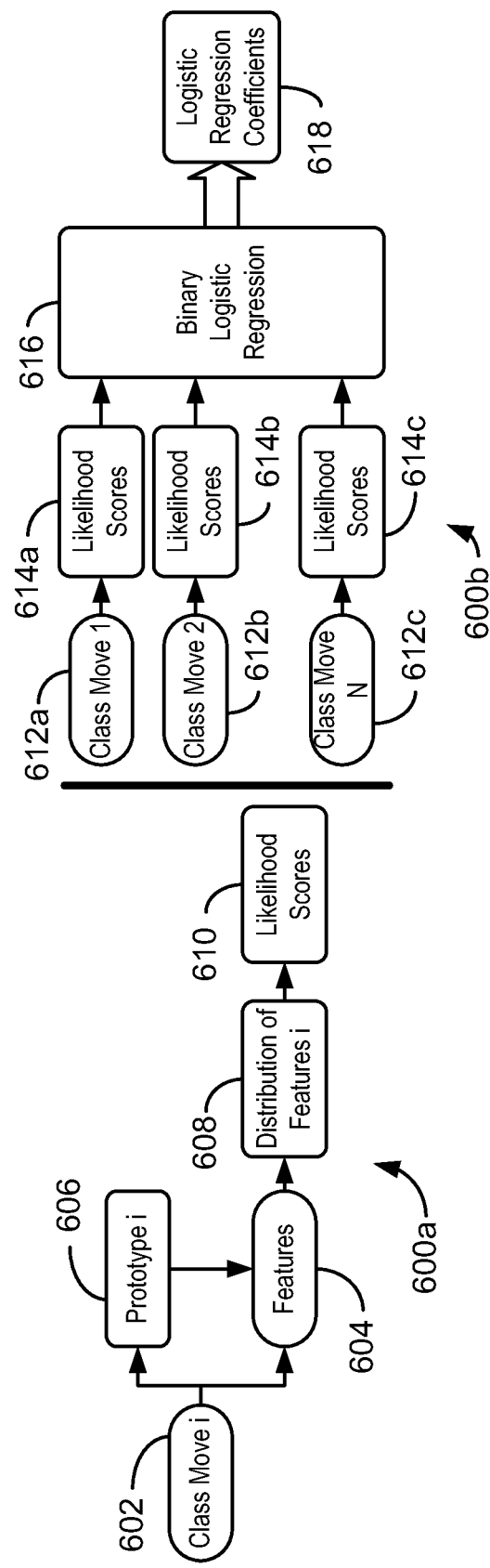
FIG. 6 is a block diagram showing a training phase in which a model is trained to perform dance step recognition according to the present technology.

As explained herein, user data may be used to train a motion recognition model implemented in a gesture recognition engine, for example, to recognize gestures such as dance moves. In a training phase, user data from a relatively large number of users may be used in conjunction with a prototype to provide the model with a basis to accurately identify when user data represents a motion that equates to the prototype. The purpose of training the model is to make it more effective at recognizing a correlation between user input data during testing and stored "ideal" or prototype data. A mean data profile may be developed for a typical or average player, and that data profile may be subsequently used to classify the dance moves of players in an effective fashion. A statistical model may be developed to determine a likelihood that a given user input corresponds to a prototype motion class in the prototype database. After the training phase, the model may be tested to determine its success in recognizing motion types such as dance moves or steps. FIG. 6 represents a training phase of a model.

FIG. 6 is a block diagram 600 showing the training of a motion recognition model to perform dance step recognition according to the present technology. In a left panel 600a of the block diagram 600, a single class move is evaluated for purposes of training. A plurality of class moves are evaluated in a right panel 600b of the block diagram 600.

Data representative of class moves may be used to train a model to recognize various dance steps or moves based on motion feature data, which may comprise frames of data obtained for each of the points shown in FIG. 2. In the left panel 600a, an example class move 602 is shown. The class move, which is representative of a particular dance move or step, may comprise feature data 604 obtained from a database of prototype motion features. A prototype 606 is shown as an example of prototype motion feature data. Data for the prototype motion feature may be captured from an expert performance of the dance move or step.

A distribution of features 608 is obtained by training the system using several instances of data performing a class move, as shown in FIG. 6. Likelihood scores 610 may be determined for each distribution of features 608. The likelihood scores represent a likelihood that the feature is a match for a given prototype.

In the right panel 600b, a plurality of class moves 612 are used to train a model to recognize gestures. A plurality of class moves 612 are evaluated. Each of the class moves 612 may correspond to a different dance move or step for which a prototype motion feature is available. A separate likelihood score 614 is created for each of the class moves 612. According to the present technology, the likelihood scores 614 may be determined as shown in the left panel 600a. Binary logic regression 616 may be performed on the likelihood scores 614 to produce logistic regression coefficients 618. As explained herein, logistic regression may be performed to select among relatively close matches of two prototype motion features.

After a model has been trained, correlation data in the form of probabilities may be stored for each prototype motion feature, for example, in a look-up table. The stored correlation data may be used during motion recognition testing and actual detection. The look-up table data may include correlation data for each point of skeletal data for a given prototype motion feature. In addition, relative energy data may also be stored in a look-up table for later use.

Figure 7A:
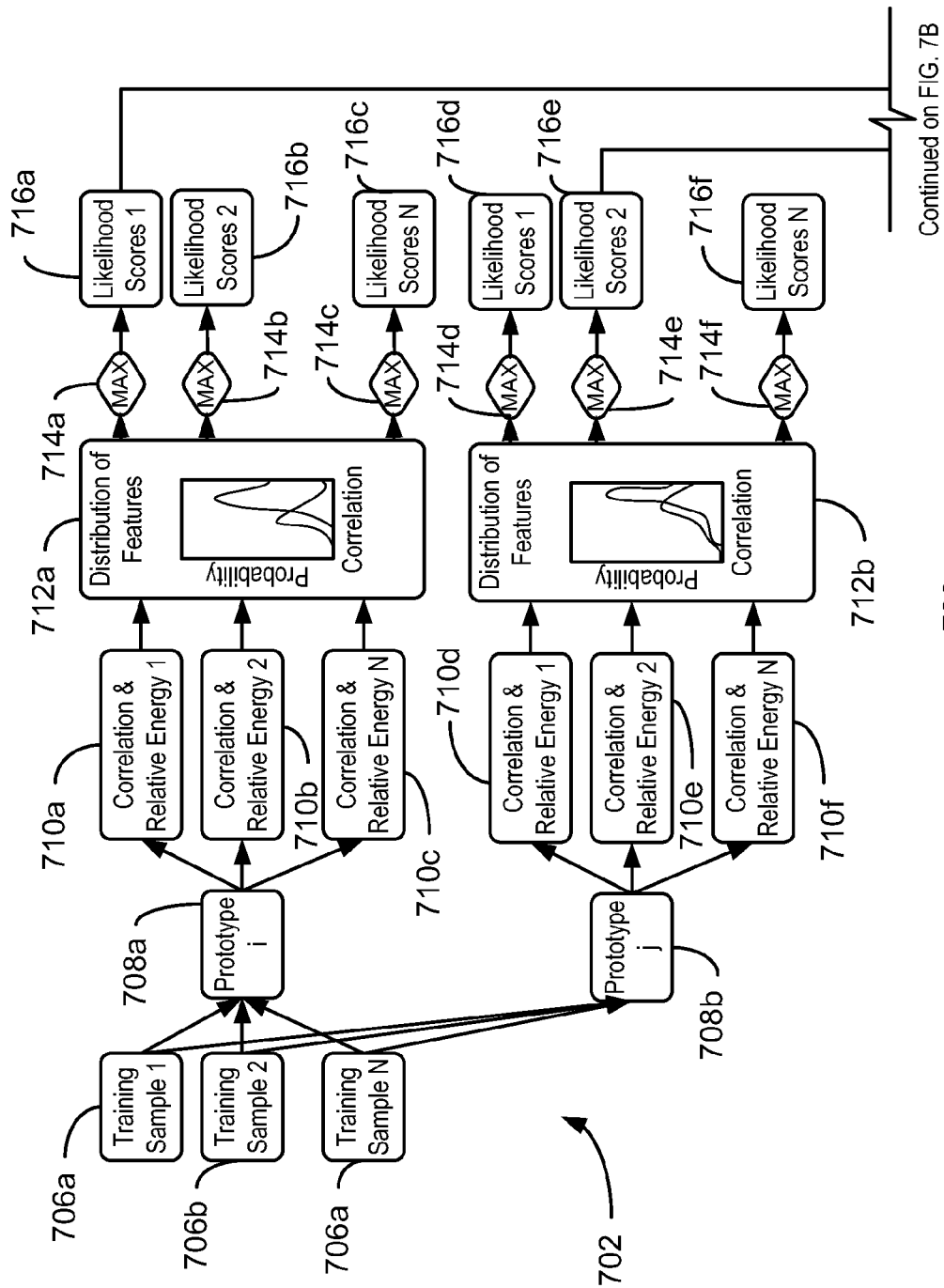
FIG. 7A and FIG. 7B, is a block diagram showing a training phase for multiple class moves according to the present technology.
Figure 7B:
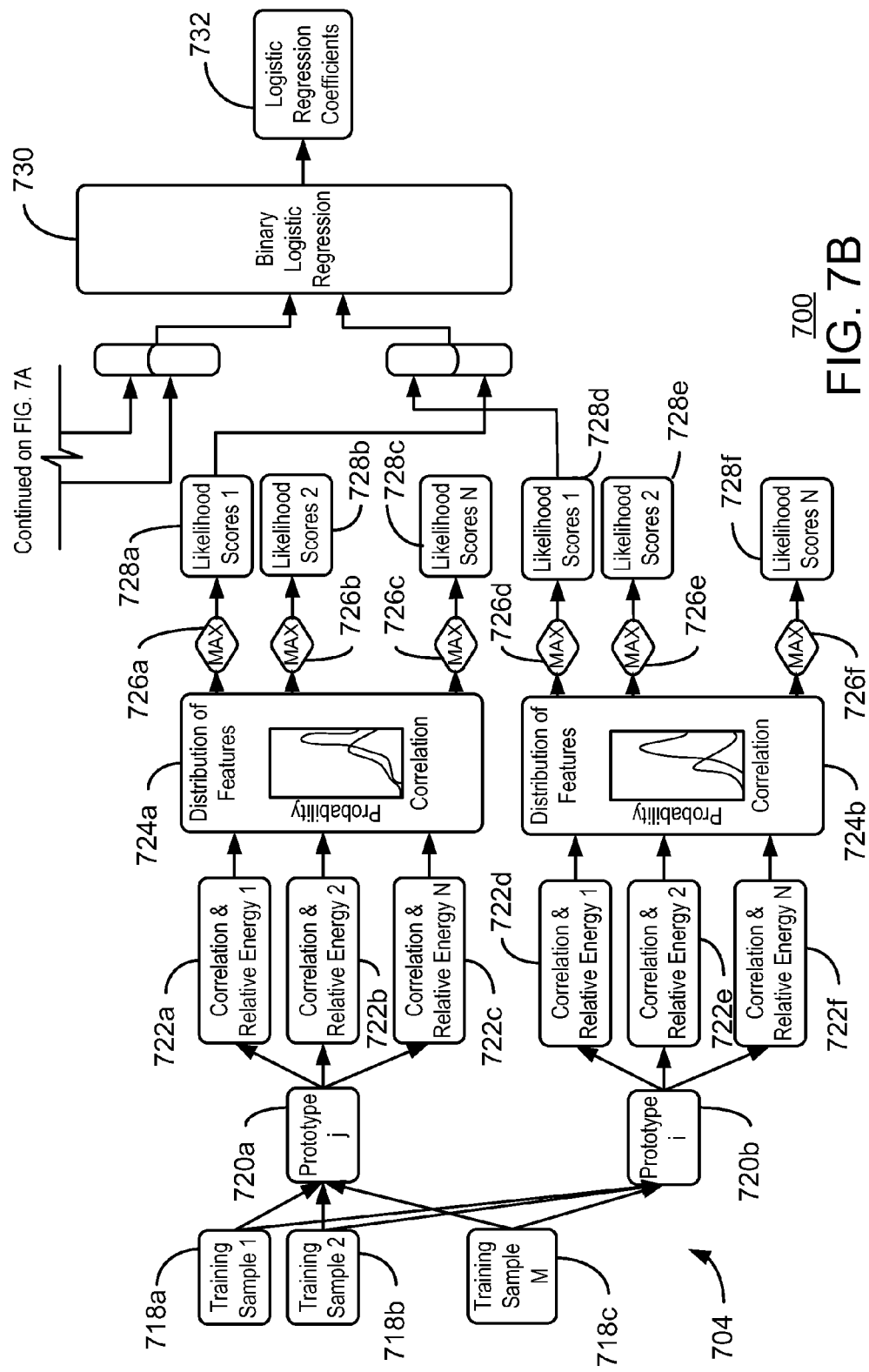

FIG. 7 is a block diagram 700 showing a training phase for multiple class moves according to the present technology. An upper panel 702 shows the training of a model for a class move i and a lower panel 704 shows the training of the model for a class move j.

In training the model for the class move i in the upper panel 702, a plurality of training samples 706 is received. A normalized, circular cross-correlation operation (represented in FIG. 7 by the acronym NCXC) is performed between the training samples 706 and a plurality of prototype motion features 708 stored, for example, in a prototype motion feature database. In the example represented in the upper panel 702, the normalized, circular cross-correlation operation is performed using two prototype motion features 708. As will be described, the present technology may be employed to identify which of the prototype motion features 708 most closely resembles the training samples 706. In an embodiment, relative energy may also be used to assist in identifying and scoring dance steps. For user data and prototype data, average energy across a given period of time may be determined.

The result of the normalized, circular cross-correlation operation between the training samples 706a, 706b, 706c and the prototype motion feature i 708a is a plurality of correlation and relative energy data sets 710a, 710b, 710c, each of which corresponds to one of the training samples 706a, 706b, 706c. A distribution of features for the correlation and relative energy data sets 710a, 710b, 710c is represented by a graph 712a.

The result of the normalized, circular cross-correlation operation between the training samples 706a, 706b, 706c and the prototype motion feature j 708b is a plurality of correlation and relative energy data 710d, 710e, 710f, each of which corresponds to one of the training samples 706a, 706b, 706c. A distribution of features for the correlation and relative energy data sets 710d, 710e, 710f is represented by a graph 712b.

The correlation and relative energy data sets 710a, 710b, 710c may be evaluated to determine which of the corresponding training samples 706a, 706b, 706c most closely correlates to the prototype motion feature i 708a. A maximum probability of correlation may be determined, as well as relative energy between the user data and the prototype data. A time offset for the maximum probability may also be determined, which may be useful for further motion analysis of the performance of the user. The maximum probability for the correlation and relative energy data sets 710a, 710b, 710c is represented as a max indication 714a, 714b, 714c. The max indications 714a, 714b, 714c may be used to determine corresponding likelihood scores 716a, 716b, 716c. The likelihood scores represents a probability that the user data is intending to perform a prototype motion feature stored in the prototype motion feature database.

The correlation and relative energy data sets 710d, 710e, 710f may be evaluated to determine which of the corresponding training samples 706a, 706b, 706c most closely correlates to the prototype motion feature j 708b. The maximum probability of correlation may be determined, as well as relative energy between the user data and the prototype data. The maximum probability for the correlation and relative energy data sets 710d, 710e, 710f is represented as a max indication 714d, 714e, 714f. The max indications 714d, 714e, 714f may be used to determine corresponding likelihood scores 716d, 716e, 716f.

In training the model for the class move j in the lower panel 704, a plurality of training samples 718 is received. A normalized, circular cross-correlation operation is performed between the training samples 718 and a plurality of prototype motion features 720 stored, for example, in a prototype motion feature database. In the example represented in the lower panel 704, the normalized, circular cross-correlation operation is performed using two prototype motion features 720. As will be described, the present technology may be employed to identify which of the prototype motion features 720 most closely resembles the training samples 718.

The result of the normalized, circular cross-correlation operation between the training samples 718a, 718b, 718c and the prototype motion feature j 720a is a plurality of correlation and relative energy data sets 722a, 722b, 722c, each of which corresponds to one of the training samples 718a, 718b, 718c. A distribution of features for the correlation and relative energy data sets 722a, 722b, 722c is represented by a graph 724a.

The result of the normalized, circular cross-correlation operation between the training samples 718a, 718b, 718c and the prototype motion feature i 720b is a plurality of correlation and relative energy data 722d, 722e, 722f, each of which corresponds to one of the training samples 718a, 718b, 718c. A distribution of features for the correlation and relative energy data sets 722d, 722e, 722f is represented by a graph 724b.

The correlation and relative energy data sets 722a, 722b, 722c may be evaluated to determine which of the corresponding training samples 718a, 718b, 718c most closely correlates to the prototype motion feature j 720a. In FIG. 7, the maximum probabilities of the correlation and relative energy data sets 722a, 722b, 722c are represented as max indications 726a, 726b, 726c. The max indications 726a, 726b, 726c may be used to determine corresponding likelihood scores 728a, 728b, 728c.

The correlation and relative energy data sets 722d, 722e, 722f may be evaluated to determine which of the corresponding training samples 718a, 718b, 718c most closely correlates to the prototype motion feature i 720b. Maximum probabilities of the correlation and relative energy data sets 722d, 722e, 722f are represented as max indications 726d, 726e, 726f. The max indications 726d, 726e, 726f may be used to determine corresponding likelihood scores 728d, 728e, 728f.

Using the likelihood scores 716a-f, 728a-f, a binary logistic regression operation 730 may be performed. The binary logistic regression operation 730 may yield logistic regression coefficients 732 that may be used to select a match between prototype motion features having similar likelihood scores.

Figure 8:
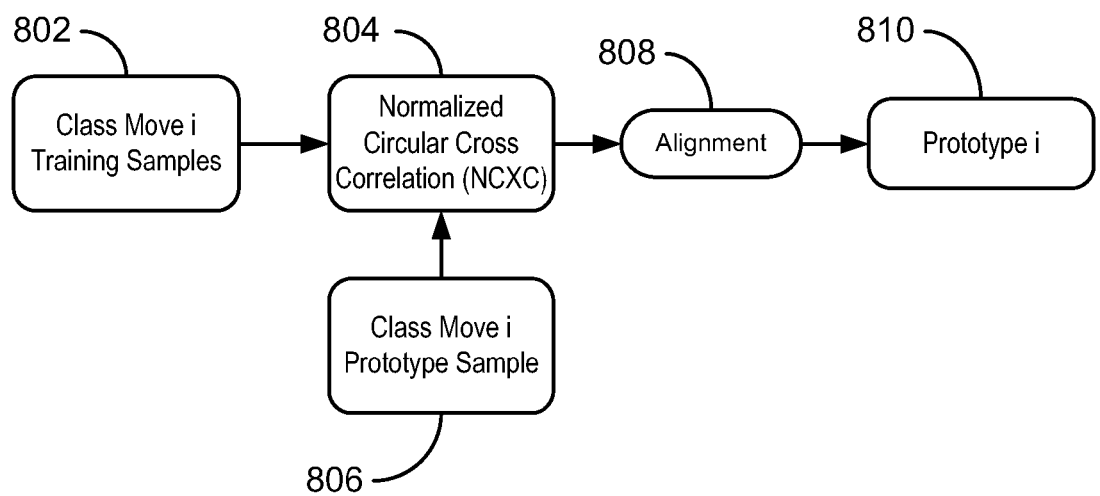
FIG. 8 is a block diagram showing a phase-shift process that may be used to align user data with stored prototype data before performing motion recognition.

FIG. 8 is a block diagram 800 showing a phase-shift process that may be used to align user data with stored prototype data before performing motion recognition. Training samples 802 of a class move are provided as part of a training phase. A cross-correlation operation 804, which may comprise normalized, circular cross-correlation (represented by the acronym NCXC in FIG. 8), is performed. The normalized, circular cross-correlation operation 804 employs a prototype sample 806, which may comprise expert data. An alignment operation 808 is performed, primarily to account for phase-shift between the training sample 802 and the prototype sample 806. The result of the alignment operation 808 is a trained prototype 810 of the class move represented by the training samples 802.

Figure 9:
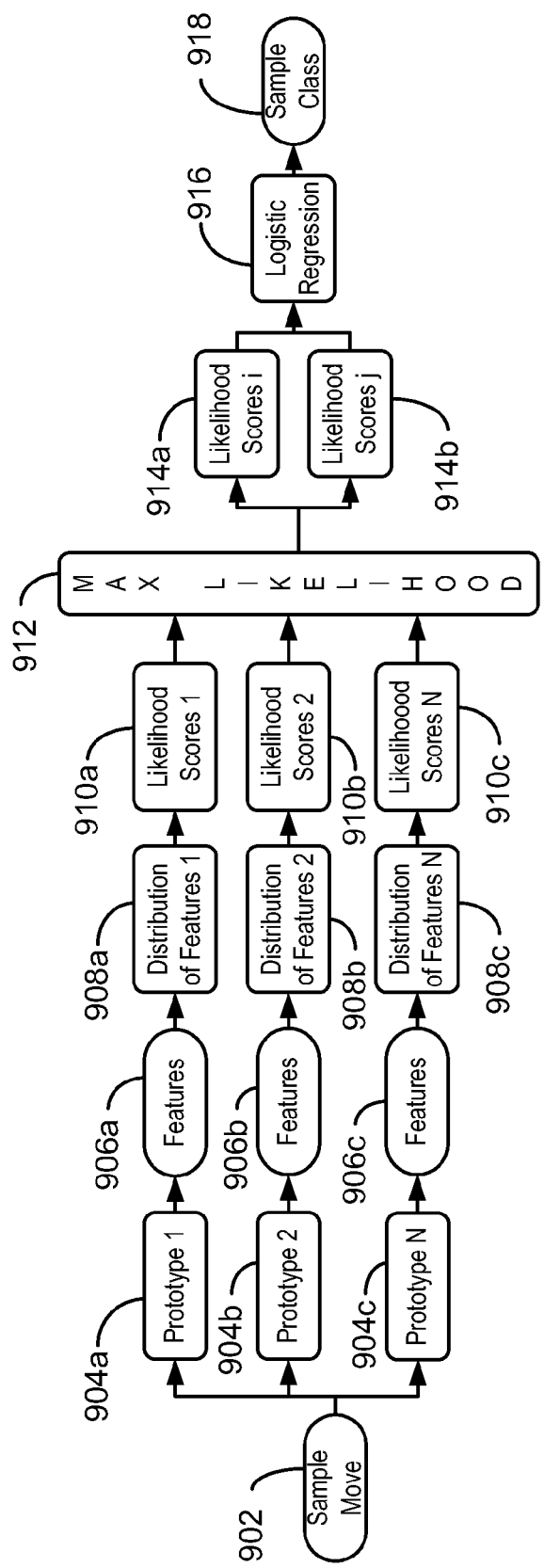
FIG. 9 is a block diagram showing the testing the ability of a model to recognize dance steps according to the present technology.

FIG. 9 is a block diagram 900 showing the testing of a model's ability to recognize dance steps according to the present technology. After training of a gesture recognition model, the model may then be used to classify actual input data. When testing the model, known input data may be used in order to verify that the model produces the correct results.

Initially, a sample move 902 is provided to the model. The sample move 902 may comprise a user data motion feature obtained from a capture device 110. The sample move 902 is represented in FIG. 9 as a plurality of prototypes 904, which are comprised of corresponding features 906. A distribution of features 908 is provided for each of the features 906. Likelihood scores 910 are provided for each of the distributions of features 908. A maximum probability is calculated with respect to a prototype motion feature, as shown at block 912. As explained herein, the maximum probability may be determined based on the likelihood scores 910.

In the example embodiment shown in FIG. 9, a subset of the prototypes having the highest probabilities may be further evaluated before a "winning" (i.e., most closely correlated) dance step or move is selected. The subset of prototypes 914 may be subjected to logistic regression 916 in order to choose a sample class 918 that most closely represents the sample move 902 in a prototype motion feature database.

Figure 10:
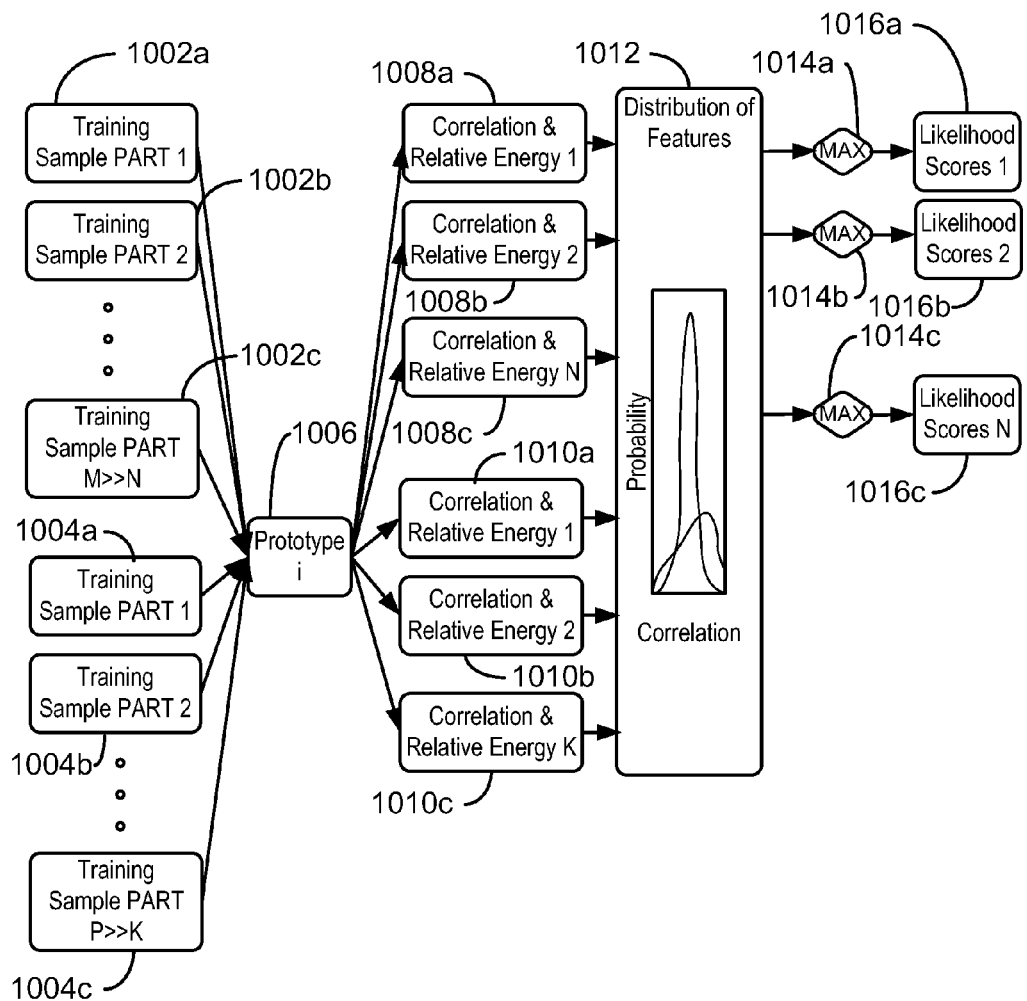
FIG. 10 is a block diagram showing the use of a model to classify a subsequence of a move according to the present technology.

FIG. 10 is a block diagram 1000 showing the use of a model to classify a subsequence of a move according to the present technology. According to the present technology, a motion recognition model may be used to recognize subsequence matches with a part of a computed prototype of a class.

A plurality of training sample parts 1002 is received. As shown in FIG. 10, the training sample parts 1002 represent parts of a motion class i. A plurality of training sample parts 1004 is also received. The training sample parts 1004 represent negative classes: data that performs motion classes other than motion class i. Using the training sample parts 1002, 1004, a cross-correlation operation is performed relative to a prototype motion class i 1006. The cross-correlation operation produces a plurality of correlation and relative energy data sets 1008a, 1008b, 1008c corresponding to the training sample parts 1002a, 1002b, 1002c. In addition, a plurality of correlation and relative energy data sets 1010a, 1010b, 1010c corresponding to the training sample parts 1004a, 1004b, 1004c are also produced.

The correlation and relative energy data sets 1008a-c and 1010a-c may be used to produce a distribution of features. In FIG. 10, the distribution of features is represented as a graph 1012. The correlation and relative energy data sets 1008a, 1008b, 1008c may be evaluated to determine which of the corresponding training sample parts 1002a, 1002b, 1002c most closely correlates to a subsequence of the prototype motion feature i. The maximum probability for the correlation and relative energy data sets 1008a, 1008b, 1008c is represented as a max indication 1014a, 1014b, 1014c. The max indications 1014a, 1014b, 1014c may be used to determine corresponding likelihood scores 1016a, 1016b, 1016c.

One goal of the present system is to identify movements, such as dance movements of a user when dancing to music played by an application running on computing environment 12. The present system makes use of the fact that movements, such as dance movements, are typically repetitive. There are basic movements at each beat of the music, with a combination of these basic movements forming a multi-beat motion that itself repeats. Thus, a user may repeat a given movement once per beat of music, or sets of beats. As the music speeds up, the user tends to move faster. As the music slows down, the user tends to move slower. The result is that the movements a user tends to make repeat every beat, or predefined number of beats. Accordingly, the present system analyzes repetitive movements over a period not based in time, but rather based on the beat of the music (or other periodic unit of measurement).

In particular, software executing in the system may normalize the number of frames of skeletal motion data to a periodic unit of measurement to provide normalized skeletal motion data sets. An example of a periodic unit of measure is a predefined number of beats in music. By normalizing the number of frames to the beat of music, or some other periodic unit of measurement, the present system is able to normalize repetitive user movements to a fixed period, independent of time. For music having a faster beat, the number of frames in the period over which a user completes one cycle of movement will be faster. For music having a slower beat, the number of frames in the period over which a user completes a cycle of movement will be slower. However, the period itself is independent of time.

The beat of the music and how it changes in a piece is predetermined generally, but it can be detected as well using music software. By using beats as a reference, rather than time, gestures can be recognized independently of the speed at which they are made. Normalizing the number of frames to a beat or other period simplifies calculations in real-time gesture recognition by making it easier to identify repetitive movements within repetitive fixed periods. This information may for example be used to identify gestures or specific movements, such as dance movements.

Further analysis may be performed to evaluate a level of skill exhibited by the user in performing the corresponding gesture. For example, the degree of correlation or similarity between the user data motion feature and the prototype motion feature data from the prototype motion feature database may be used as a basis to score the performance of the user in a game context. In other words, the user may be awarded a higher game score for more closely approximating the motion or gesture represented in the prototype motion feature database.

Figure 11:
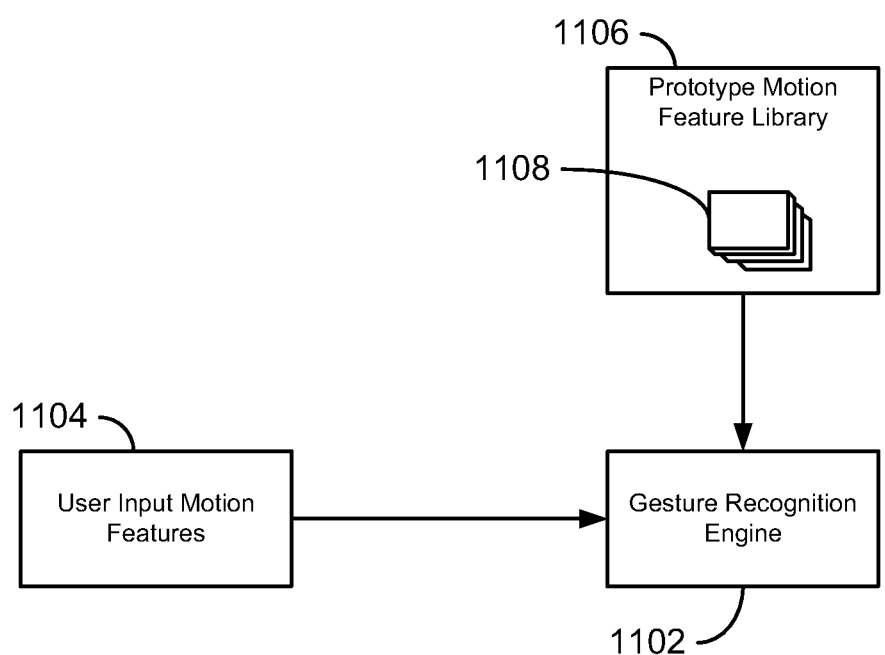
FIG. 11 is a block diagram of a gesture recognition engine embodiment according to the present technology.

FIG. 11 is a block diagram 1100 of a gesture recognition engine embodiment according to the present technology. A gesture recognition engine 1102 processes user input data in the form of user input motion features 1104. Moreover, the gesture recognition engine may comprise a gesture classification system such as the gesture classification system 400 shown in FIG. 4.

In one embodiment, a prototype motion feature database or library 1106 accessible by the gesture recognition engine 1102 stores a catalog of prototype motion features 1108 to represent motion classes such as dance types, steps or the like against which a user's movements can be correlated. A stored prototype motion feature may define a position, location or the like for a plurality of the skeletal data points shown in FIG. 2. The prototype motion features 1108 may be created using expert data, such as by capturing motion features as performed by professional dancers. Example embodiments of the gesture recognition engine 1102 may, for example, use Hidden Markov Models and logistic regression.

Figure 12:
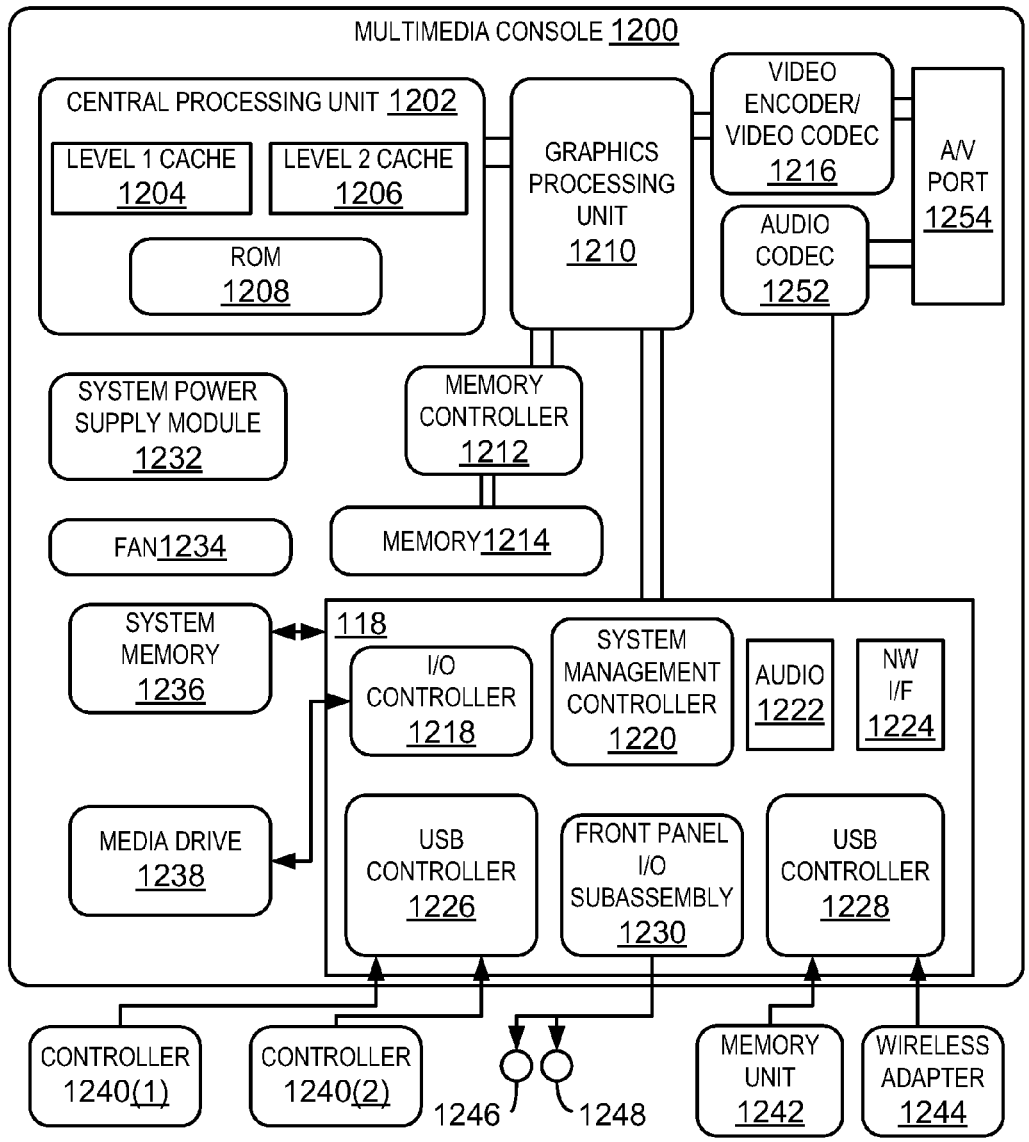
FIG. 12 is a diagram showing an example embodiment of a computing environment that may be used to recognize human body motion in a target recognition, analysis, and tracking system.

FIG. 12 illustrates an example embodiment of a computing environment that may be used to interpret one or more gestures in a target recognition, analysis, and tracking system. The computing environment such as the computing environment 12 described above with respect to FIGS. 1A-C may be a multimedia console 1200, such as a gaming console. As shown in FIG. 12, the multimedia console 1200 has a central processing unit (CPU) 1202 having computer-readable storage media that may include a level 1 cache 1204, a level 2 cache 1206, and a flash ROM 1208. The level 1 cache 1204 and a level 2 cache 1206 temporarily store data and hence reduce the number of memory access cycles, thereby improving processing speed and throughput. The CPU 1202 may be provided having more than one core, and thus, additional level 1 and level 2 caches 1204 and 1206. The flash ROM 1208 may store executable code that is loaded during an initial phase of a boot process when the multimedia console 1200 is powered ON.

A graphics processing unit (GPU) 1210 and a video encoder/video codec (coder/decoder) 1216 form a video processing pipeline for high speed and high resolution graphics processing. Data is carried from the GPU 1210 to the video encoder/video codec 1216 via a bus. The video processing pipeline outputs data to an A/V (audio/video) port 1238 for transmission to a television or other display. A memory controller 1212 is connected to the GPU 1210 to facilitate processor access to various types of memory 1214, such as, but not limited to, a RAM.

The multimedia console 1200 includes an I/O controller 1218, a system management controller 1220, an audio processing unit 1222, a network interface controller 1224, a first USB host controller 1226, a second USB host controller 1228 and a front panel I/O subassembly 1230 that may be implemented on a module. The USB controllers 1226 and 1228 serve as hosts for peripheral controllers 1240(1)-1240(2), a wireless adapter 1244, and an external memory device 1242 (e.g., flash memory, external CD/DVD ROM drive, removable media, etc.). The network interface 1224 and/or wireless adapter 1244 provide access to a network (e.g., the Internet, home network, etc.) and may be any of a wide variety of various wired or wireless adapter components including an Ethernet card, a modem, a Bluetooth module, a cable modem, and the like.

System memory 1236 is provided to store application data that is loaded during the boot process. A media drive 144 is provided and may comprise a DVD/CD drive, hard drive, or other removable media drive, etc. The media drive 144 may be internal or external to the multimedia console 1200. Application data may be accessed via the media drive 144 for execution, playback, etc. by the multimedia console 1200. The media drive 144 is connected to the I/O controller 1218 via a bus, such as a Serial ATA bus or other high speed connection (e.g., IEEE 1394).

The system management controller 1220 provides a variety of service functions related to assuring availability of the multimedia console 1200. The audio processing unit 1222 and an audio codec 132 form a corresponding audio processing pipeline with high fidelity and stereo processing. Audio data is carried between the audio processing unit 1222 and the audio codec 132 via a communication link. The audio processing pipeline outputs data to the A/V port 1238 for reproduction by an external audio player or device having audio capabilities.

The front panel I/O subassembly 1230 supports the functionality of the power button 1246 and the eject button 1248, as well as any LEDs (light emitting diodes) or other indicators exposed on the outer surface of the multimedia console 1200. A system power supply module 1232 provides power to the components of the multimedia console 1200. A fan 1234 cools the circuitry within the multimedia console 1200.

The CPU 1202, GPU 1210, memory controller 1212, and various other components within the multimedia console 1200 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 1200 is powered ON, application data may be loaded from the system memory 1236 into memory 1214 and/or caches 1204, 1206 and executed on the CPU 1202. The application may present a graphical user interface that provides a consistent user experience when navigating to different media types available on the multimedia console 1200. In operation, applications and/or other media contained within the media drive 144 may be launched or played from the media drive 144 to provide additional functionalities to the multimedia console 1200.

The multimedia console 1200 may be operated as a standalone system by simply connecting the system to a television or other display. In this standalone mode, the multimedia console 1200 allows one or more users to interact with the system, watch movies, or listen to music. However, with the integration of broadband connectivity made available through the network interface 1224 or the wireless adapter 1244, the multimedia console 1200 may further be operated as a participant in a larger network community.

When the multimedia console 1200 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation is desirably large enough to contain the launch kernel, concurrent system applications and drivers. The CPU reservation is desirably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay may scale with screen resolution. Where a full user interface is used by the concurrent system application, it may be desirable to use a resolution independent of the application resolution. A scaler may be used to set this resolution such that the need to change frequency and cause a TV re-synch is eliminated.

After the multimedia console 1200 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 1202 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1240(1) and 1240(2)) are shared by gaming applications and system applications. The input devices are not reserved resources, but are to be switched between system applications and the gaming application such that each will have a focus of the device. The application manager may control the switching of input stream, without knowledge of the gaming application's knowledge and a driver maintains state information regarding focus switches. The cameras 128, 130 and capture device 122 may define additional input devices for the console 1200.

Figure 13:
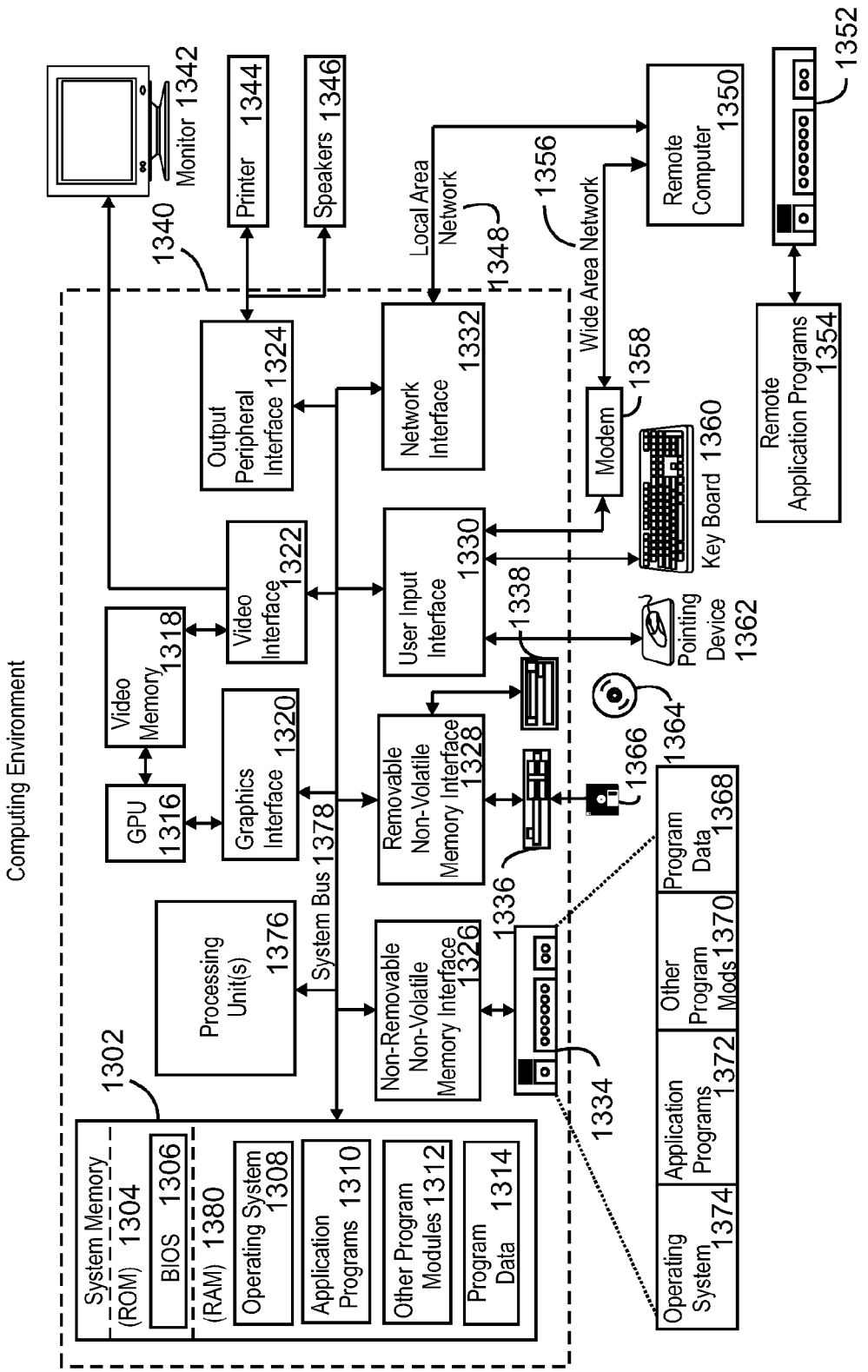
FIG. 13 is a diagram showing another example embodiment of a computing environment that may be used to recognize human body motion in a target recognition, analysis, and tracking system.

FIG. 13 illustrates another example embodiment of a computing environment 1300 that may be the computing environment 12 shown in FIGS. 1A-2 used to interpret one or more gestures in a target recognition, analysis, and tracking system. The computing environment 1300 is only one example of a suitable computing environment and is not intended to suggest any limitation as to the scope of use or functionality of the presently disclosed subject matter. Neither should the computing environment 1300 be interpreted as having any dependency or requirement relating to any one or combination of components illustrated in the exemplary computing environment 1300. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 13, the computing environment 1300 comprises a computer 1340, which typically includes a variety of computer readable media. Computer readable media can be any available media that can be accessed by computer 1340 and includes both volatile and nonvolatile media, removable and non-removable media. The system memory 1302 includes computer storage media in the form of volatile and/or nonvolatile memory such as ROM 1304 and RAM 1380. A basic input/output system 1306 (BIOS), containing the basic routines that help to transfer information between elements within computer 1340, such as during start-up, is typically stored in ROM 1304. RAM 1380 typically contains data and/or program modules that are immediately accessible to and/or presently being operated on by processing unit 1376. By way of example, and not limitation, FIG. 13 illustrates operating system 1308, application programs 1310, other program modules 1312, and program data 1314.

The computer 1340 may also include other removable/non-removable, volatile/nonvolatile computer storage media. By way of example only, FIG. 13 illustrates a hard disk drive 1334 that reads from or writes to non-removable, nonvolatile magnetic media, a magnetic disk drive 1336 that reads from or writes to a removable, nonvolatile magnetic disk 1366, and an optical disk drive 1338 that reads from or writes to a removable, nonvolatile optical disk 1364 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1334 is typically connected to the system bus 1378 through a non-removable memory interface such as interface 1326, and magnetic disk drive 1336 and optical disk drive 1338 are typically connected to the system bus 1378 by a removable memory interface, such as interface 1328.

The drives and their associated computer storage media discussed above and illustrated in FIG. 13, provide storage of computer readable instructions, data structures, program modules and other data for the computer 1340. In FIG. 13, for example, hard disk drive 1334 is illustrated as storing operating system 1374, application programs 1372, other program modules 1370, and program data 1368. Note that these components can either be the same as or different from operating system 1308, application programs 1310, other program modules 1312, and program data 1314. Operating system 1374, application programs 1372, other program modules 1370, and program data 1368 are given different numbers here to illustrate that, at a minimum, they are different copies. A user may enter commands and information into the computer 1340 through input devices such as a keyboard 1360 and a pointing device 1362, commonly referred to as a mouse, trackball or touch pad. Other input devices (not shown) may include a microphone, joystick, game pad, satellite dish, scanner, or the like. These and other input devices are often connected to the processing unit 1376 through a user input interface 1330 that is coupled to the system bus, but may be connected by other interface and bus structures, such as a parallel port, game port or a universal serial bus (USB). The cameras 128, 130 and capture device 110 may define additional input devices for the console 1200. A monitor 1342 or other type of display device is also connected to the system bus 1378 via an interface, such as a video interface 1322. In addition to the monitor, computers may also include other peripheral output devices such as speakers 1346 and printer 1344, which may be connected through an output peripheral interface 1324.

The computer 1340 may operate in a networked environment using logical connections to one or more remote computers, such as a remote computer 1350. The remote computer 1350 may be a personal computer, a server, a router, a network PC, a peer device or other common network node, and typically includes many or all of the elements described above relative to the computer 1340, although only a memory storage device 1352 has been illustrated in FIG. 13. The logical connections depicted in FIG. 13 include a local area network (LAN) 1348 and a wide area network (WAN) 1356, but may also include other networks. Such networking environments are commonplace in offices, enterprise-wide computer networks, intranets and the Internet.

When used in a LAN networking environment, the computer 1340 is connected to the LAN 1348 through a network interface or adapter 1332. When used in a WAN networking environment, the computer 1340 typically includes a modem 1358 or other means for establishing communications over the WAN 1356, such as the Internet. The modem 1358, which may be internal or external, may be connected to the system bus 1378 via the user input interface 1330, or other appropriate mechanism. In a networked environment, program modules depicted relative to the computer 1340, or portions thereof, may be stored in the remote memory storage device. By way of example, and not limitation, FIG. 13 illustrates remote application programs 1354 as residing on memory device 1352. It will be appreciated that the network connections shown are exemplary and other means of establishing a communications link between the computers may be used.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of motion recognition of body motion based on skeletal model data derived from image data of a user, comprising:
   receiving skeletal motion data representative of a user data motion feature from a capture device, the skeletal motion data relating to a position of a user within a scene;
   determining a cross-correlation of the received skeletal motion data relative to a prototype mean associated with a plurality of prototype motion features from a prototype motion feature database;
   performing a cascaded correlation-based classification by:
      ranking likelihoods that the skeletal motion data corresponds to each of the plurality of prototype motion features, the likelihoods being based on the cross-correlation; and
      performing a classifying operation, in addition to the ranking, on a subset of the plurality of prototype motion features, the subset of the plurality of prototype motion features having the relatively highest likelihoods of corresponding to the skeletal motion data.

2. The method of claim 1, wherein the skeletal motion data comprises angular wireframe data represented by pairs of angles for a set of first-degree joints and a set of second-degree joints.

3. The method of claim 2, wherein the pairs of angles are represented as Tait-Bryan angles.

4. The method of claim 1, wherein the skeletal motion data comprises a rotation matrix of a torso frame with respect to a coordinate frame of the capture device.

5. The method of claim 1, comprising performing a training operation to modify data representing the plurality of prototype motion features based on a plurality of training samples for each of the plurality of prototype motion features.

6. The method of claim 1, comprising performing a testing operation to assess an ability of a model to obtain the likelihoods that the skeletal motion data corresponds to the plurality of prototype motion features.

7. The method of claim 1, comprising predicting that the user data motion feature matches one of the plurality of prototype motion features.

8. The method of claim 1, comprising determining an offset for the received skeletal motion data relative to each of the plurality of prototype motion features.

9. The method of claim 1, wherein the classifying operation comprises a pairwise classification using logistic regression, linear discriminant analysis or support vector machine (SVM) analysis.

10. The method of claim 1, wherein the user data motion feature corresponds to a periodic unit.

11. The method of claim 10, wherein the periodic unit is synchronized to a beat of music.

12. The method of claim 1, wherein the cross-correlation comprises a normalized, circular cross-correlation.

13. A system for performing motion recognition of body motion based on skeletal model data derived from image data of a user, the system comprising:
    a processing unit; and
    a system memory, wherein the system memory comprises code configured to direct the processing unit to:
       receive skeletal motion data representative of a user data motion feature from a capture device;
       determine a cross-correlation of the received skeletal motion data relative to a prototype mean associated with a plurality of prototype motion features from a prototype motion feature database;
       perform a cascaded correlation-based classification, wherein the cascaded correlation-based classification is to:
          rank likelihoods that the skeletal motion data corresponds to each of the plurality of prototype motion features, the likelihoods being based on the cross-correlation; and
          perform a classifying operation, in addition to the ranking, on a subset of the plurality of prototype motion features, the subset of the plurality of prototype motion features having the relatively highest likelihoods of corresponding to the skeletal motion data.

14. The system of claim 13, comprising code configured to direct the processing unit to perform a training operation to modify data representing the plurality of prototype motion features based on a plurality of training samples for each of the plurality of prototype motion features.

15. The system of claim 13, comprising code configured to direct the processing unit to perform a testing operation to assess an ability of a model to obtain the likelihoods that the skeletal motion data corresponds to the plurality of prototype motion features.

16. The system of claim 13, comprising code configured to direct the processing unit to predict that the user data motion feature matches one of the plurality of prototype motion features.

17. The system of claim 13, comprising code configured to direct the processing unit to determine an offset for the received skeletal motion data relative to each of the plurality of prototype motion features.

18. The system of claim 13, wherein the classifying operation comprises a pairwise classification using logistic regression, linear discriminant analysis or support vector machine (SVM) analysis.

19. The system of claim 13, wherein the user data motion feature is synchronized to a beat of music.

20. One or more computer-readable storage device, comprising code configured to direct a processing unit to:
- receive skeletal motion data representative of a user data motion feature from a capture device;
- determine a cross-correlation of the received skeletal motion data relative to a plurality of prototype motion features from a prototype motion feature database;
- perform a cascaded correlation-based classification, wherein the cascaded correlation-based classification is to:
- rank likelihoods that the skeletal motion data corresponds to each of the plurality of prototype motion features, the likelihoods being based on the cross-correlation; and
- perform a classifying operation, in addition to the ranking, on a subset of the plurality of prototype motion features, the subset of the plurality of prototype motion features having the relatively highest likelihoods of corresponding to the skeletal motion data.

\* \* \* \* \*